(12) United States Patent
Fischl et al.

(10) Patent No.: US 11,359,684 B2
(45) Date of Patent: **\*Jun. 14, 2022**

(54) DISC BRAKE FOR A COMMERCIAL VEHICLE, BRAKE PAD, AND BRAKE PAD SET

(71) Applicant: KNORR-BREMSE Systeme fuer Nutzfahrzeuge GmbH, Munich (DE)

(72) Inventors: Tobias Fischl, Munich (DE); Wolfgang Pritz, Munich (DE); Andreas Petschke, Neuburg am Inn (DE); Josef Schropp, Eichendorf (DE); Julian Cato Dahlenburg, Georgensgmuend (DE); Markus Bartel, Munich (DE)

(73) Assignee: KNORR-BREMSE Systeme fuer Nutzfahrzeuge GmbH, Munich (DE)

( \* ) Notice: Subject to any disclaimer, the term of this patent is extended or adjusted under 35 U.S.C. 154(b) by 396 days.

This patent is subject to a terminal disclaimer.

(21) Appl. No.: 16/196,498

(22) Filed: Nov. 20, 2018

(65) Prior Publication Data

US 2019/0085917 A1 Mar. 21, 2019

Related U.S. Application Data

(63) Continuation of application No. PCT/EP2017/060583, filed on May 3, 2017.

(30) Foreign Application Priority Data

May 20, 2016 (DE) .................... 10 2016 109 360.2
Mar. 16, 2017 (DE) .................... 10 2017 105 641.6
Apr. 3, 2017 (WO) ................ PCT/EP2017/057857

(51) Int. Cl.
*F16D 55/227* (2006.01)
*F16D 65/097* (2006.01)

(52) U.S. Cl.
CPC ....... *F16D 55/227* (2013.01); *F16D 65/0978* (2013.01); *F16D 2250/0084* (2013.01)

(58) Field of Classification Search
CPC ............ F16D 2055/0016; F16D 65/18; F16D 2055/0041; F16D 55/226; F16D 55/227;
(Continued)

(56) References Cited

U.S. PATENT DOCUMENTS 3,920,104 A 11/1975 Hoffmann
3,933,226 A 1/1976 Maurice
(Continued)

FOREIGN PATENT DOCUMENTS

CN 1108465 C 5/2003
CN 1517572 A 8/2004
(Continued)

OTHER PUBLICATIONS

International Preliminary Report on Patentability (PCT/IB/326 & PCT/IB/373) issued in PCT Application No. PCT/EP2017/060583 dated Nov. 29, 2018, including English translation of document C2 (German-language Written Opinion (PCT/ISA/237) previously filed on Nov. 26, 2018) (nine (9) pages).
(Continued)

*Primary Examiner* — Robert A. Siconolfi
*Assistant Examiner* — Mahbubur Rashid
(74) *Attorney, Agent, or Firm* — Crowell & Moring LLP

(57) ABSTRACT

A disc brake for a commercial vehicle is provided. The disc brake includes a brake caliper, preferably in the form of a sliding caliper, straddling a brake disc, being arranged on a fixed backing plate, and having an application device for applying the brake. The disk brake also includes two brake pads, each having a pad carrier and an affixed friction pad, and each being inserted into a pad shaft of the backing plate. The brake caliper has a central caliper opening over the disc (Continued)

brake. A hold-down bar is provided, designed in such a way that, of the two brake pads, it radially secures only the reaction-side brake pad in its lining shaft in the backing plate. The hold-down bar is held on the brake caliper by its end facing away from the brake pad. Additionally, the application-side brake pad is radially interlockingly secured in its pad shaft in the backing plate. The application-side brake pad has a brake pad spring, which is held on the application-side brake pad and includes ends which rest resiliently on horns of the backing plate.

26 Claims, 36 Drawing Sheets

(58) Field of Classification Search
CPC .............. F16D 65/0977; F16D 65/0972; F16D 65/0979; F16D 65/0978; F16D 2055/0029; F16D 2065/1396; F16D 55/2262; F16D 65/0068; F16D 2250/0084; F16D 51/48; F16D 65/00; F16D 65/0976
See application file for complete search history.

(56) References Cited

U.S. PATENT DOCUMENTS

| | | | |
|---|---|---|---|
| 4,552,253 A | 11/1985 | Burgdorf et al. | |
| 5,090,520 A * | 2/1992 | Gockel | F16D 55/226 188/73.45 |
| 6,293,373 B1 | 9/2001 | Weiler et al. | |
| 6,959,788 B2 | 11/2005 | Baumgartner et al. | |
| 7,316,301 B2 * | 1/2008 | Roberts | F16D 55/28 188/250 B |
| 7,837,015 B2 * | 11/2010 | Klement | F16D 65/0977 188/73.38 |
| 7,926,631 B2 * | 4/2011 | Roberts | F16D 55/2265 188/250 B |
| 8,016,084 B2 * | 9/2011 | Camilo-Martinez | F16D 65/0978 188/73.38 |
| 8,215,458 B2 * | 7/2012 | Wolf | F16D 65/0978 188/73.36 |
| 8,220,595 B2 * | 7/2012 | Camilo-Martinez | F16D 65/0978 188/73.38 |
| 8,496,093 B2 * | 7/2013 | Kreuzeder | F16D 66/02 188/73.38 |
| 8,544,614 B1 * | 10/2013 | Plantan | F16D 65/095 188/73.32 |
| 8,662,261 B2 * | 3/2014 | Raffin | F16D 65/0978 188/73.32 |
| 8,973,720 B2 * | 3/2015 | Plantan | F16D 65/095 188/73.32 |
| 9,188,179 B2 * | 11/2015 | Camilo-Martinez | F16D 65/092 |
| 9,599,176 B2 * | 3/2017 | Baumgartner | F16D 65/0972 |
| 2003/0085083 A1 * | 5/2003 | Baumgartner | F16D 65/092 188/73.31 |
| 2004/0163899 A1 | 8/2004 | Heinlein | |
| 2004/0222050 A1 | 11/2004 | Beringer | |
| 2005/0284710 A1 * | 12/2005 | Roberts | F16D 65/092 188/73.1 |
| 2008/0264739 A1 * | 10/2008 | Pritz | F16D 65/0043 188/73.31 |
| 2009/0020380 A1 | 1/2009 | Camilo-Martinez et al. | |
| 2009/0211857 A1 * | 8/2009 | Camilo-Martinez | F16D 65/0978 188/250 B |
| 2009/0236188 A1 * | 9/2009 | Raffin | F16D 65/0974 188/73.31 |
| 2010/0230220 A1 | 9/2010 | Keller et al. | |
| 2012/0085597 A1 * | 4/2012 | Narayanan V | F16D 65/092 188/72.1 |
| 2014/0345983 A1 | 11/2014 | Baumgartner et al. | |
| 2015/0122602 A1 | 5/2015 | Shimamura et al. | |
| 2015/0184710 A1 | 7/2015 | Peschel et al. | |

FOREIGN PATENT DOCUMENTS

| | | | |
|---|---|---|---|
| CN | 1712750 A | 12/2005 | |
| CN | 102011816 A | 4/2011 | |
| CN | 104583633 A | 4/2015 | |
| CN | 104632946 A | 5/2015 | |
| CN | 104769307 A | 7/2015 | |
| DE | 22 11 013 A | 9/1973 | |
| DE | 32 23 627 A1 | 12/1983 | |
| DE | 40 20 287 A1 | 1/1992 | |
| DE | 694 00 875 T2 | 3/1997 | |
| DE | 100 18 523 A1 | 10/2001 | |
| DE | 696 26 573 T2 | 4/2004 | |
| DE | 10 2010 019 470 A1 | 11/2011 | |
| DE | 20 2013 102 650 U1 | 9/2013 | |
| DE | 10 2012 110 461 A1 | 4/2014 | |
| DE | 10 2014 106 090 A1 | 11/2015 | |
| DE | 10 2015 114 351 A1 | 3/2017 | |
| EP | 0 694 134 B1 | 11/1996 | |
| EP | 0 752 541 B1 | 3/2003 | |
| EP | 1 963 702 B1 | 3/2010 | |
| EP | 2 255 101 B1 | 6/2011 | |
| EP | 2 923 104 B1 | 5/2018 | |
| FR | 2 061 830 A5 | 6/1971 | |
| FR | 2 206 457 A1 | 6/1974 | |
| FR | 2 437 528 A1 | 4/1980 | |
| GB | 2 031 085 A | 4/1980 | |
| GB | 2031085 A * | 4/1980 | ........... F16D 55/227 |
| JP | 2-85035 U | 7/1990 | |
| JP | 2007-155024 A | 6/2007 | |
| JP | 2015-507155 A | 3/2015 | |
| RU | 2 442 042 C2 | 2/2012 | |
| RU | 2 482 344 C2 | 5/2013 | |
| WO | WO 2012/111828 A1 | 8/2012 | |
| WO | WO 2014/079869 A1 | 5/2014 | |
| WO | WO 2015/050638 A1 | 4/2015 | |

OTHER PUBLICATIONS

Japanese-language Office Action issued in Japanese Application No. 2018-560817 dated Feb. 3, 2020 with English translation (15 pages).
Chinese-language Office Action issued in counterpart Chinese Application No. 201780038649.4 dated Sep. 4, 2019 with English translation (16 pages).
Russian-language Office Action issued in counterpart Russian Application No. 2018143301/11(072131) dated Jul. 23, 2019 with English translation (16 pages).
International Search Report (PCT/ISA/210) issued in PCT Application No. PCT/EP2017/060583 dated Oct. 10, 2017 with English translation (10 pages).
German-language Written Opinion (PCT/ISA/237) issued in PCT Application No. PCT/EP2017/060583 dated Oct. 10, 2017 (eight (8) pages).
International Search Report (PCT/ISA/210) issued in PCT Application No. PCT/EP2017/057857 dated Jul. 18, 2017 with English Translation (seven (7) pages).
German-language Written Opinion (PCT/ISA/237) issued in PCT Application No. PCT/EP2017/057857 dated Jul. 18, 2017 with English translation (eight (8) pages).
German-language Office Action issued in counterpart German Application No. 10 2017 105 641.6 dated Nov. 8, 2017 (seven (7) pages).
German-language Office Action issued in counterpart German Application No. 10 2016 109 360.2 dated Mar. 14, 2017 (nine (9) pages).
Hindi-language Office Action issued in Indian Application No. 201837043368 dated Jun. 22, 2020 with English translation (five (5) pages).

* cited by examiner

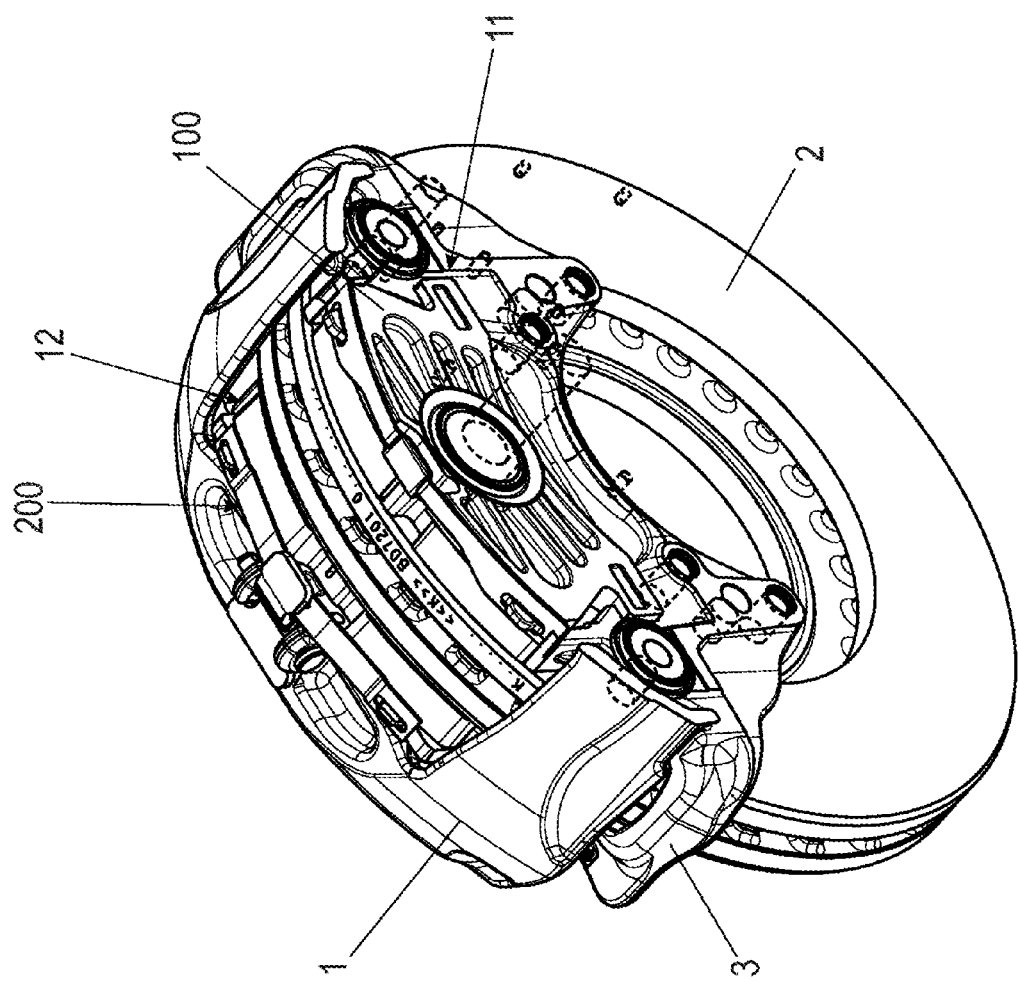

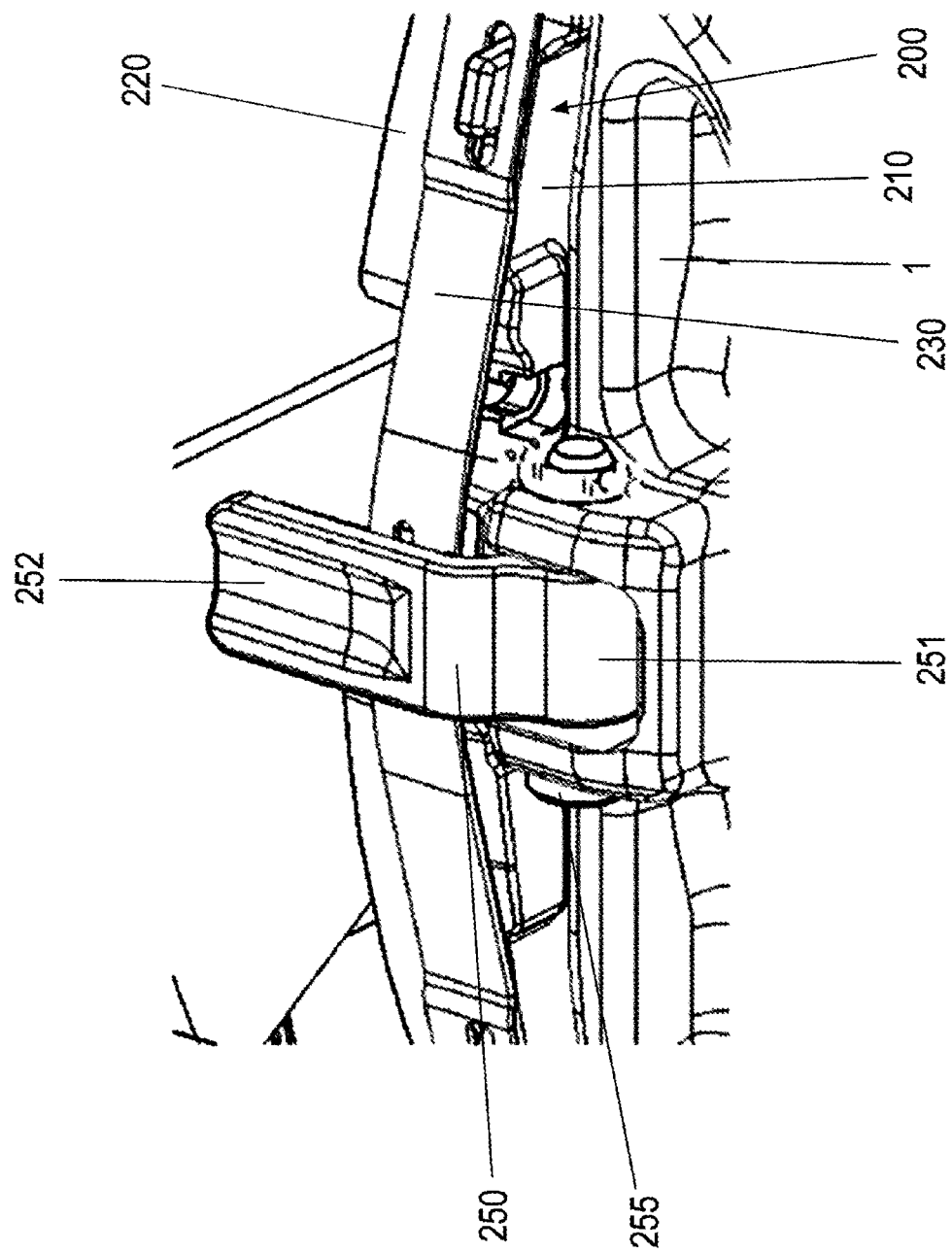

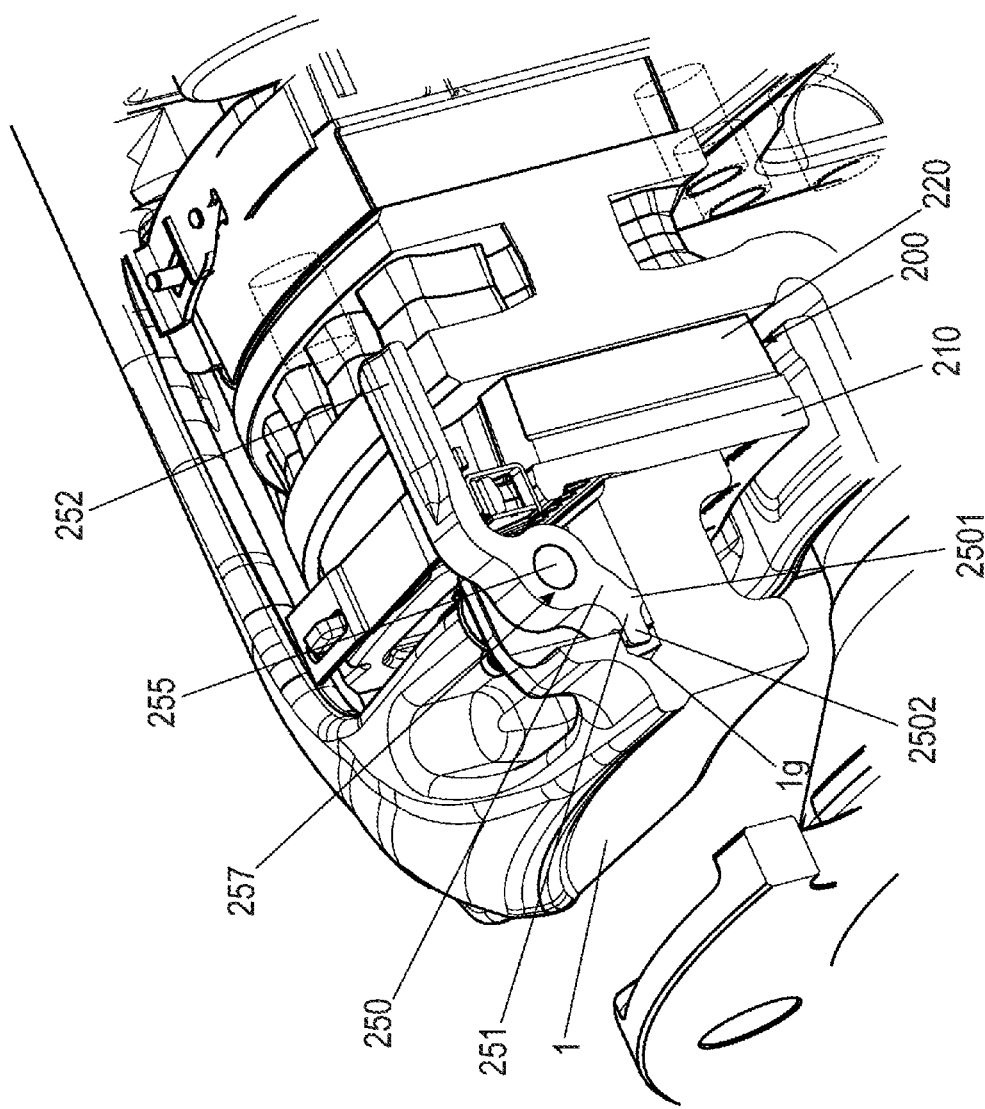

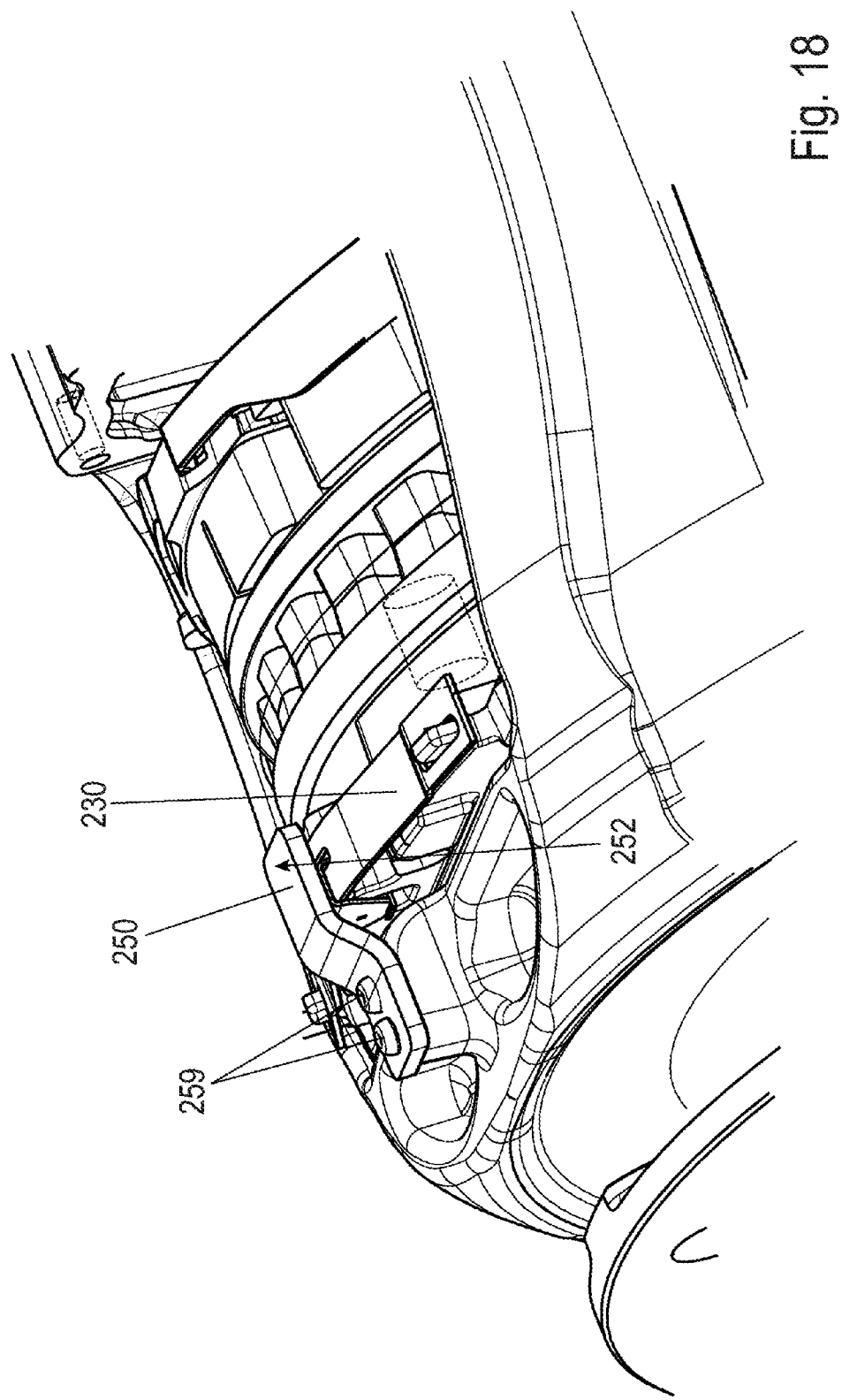

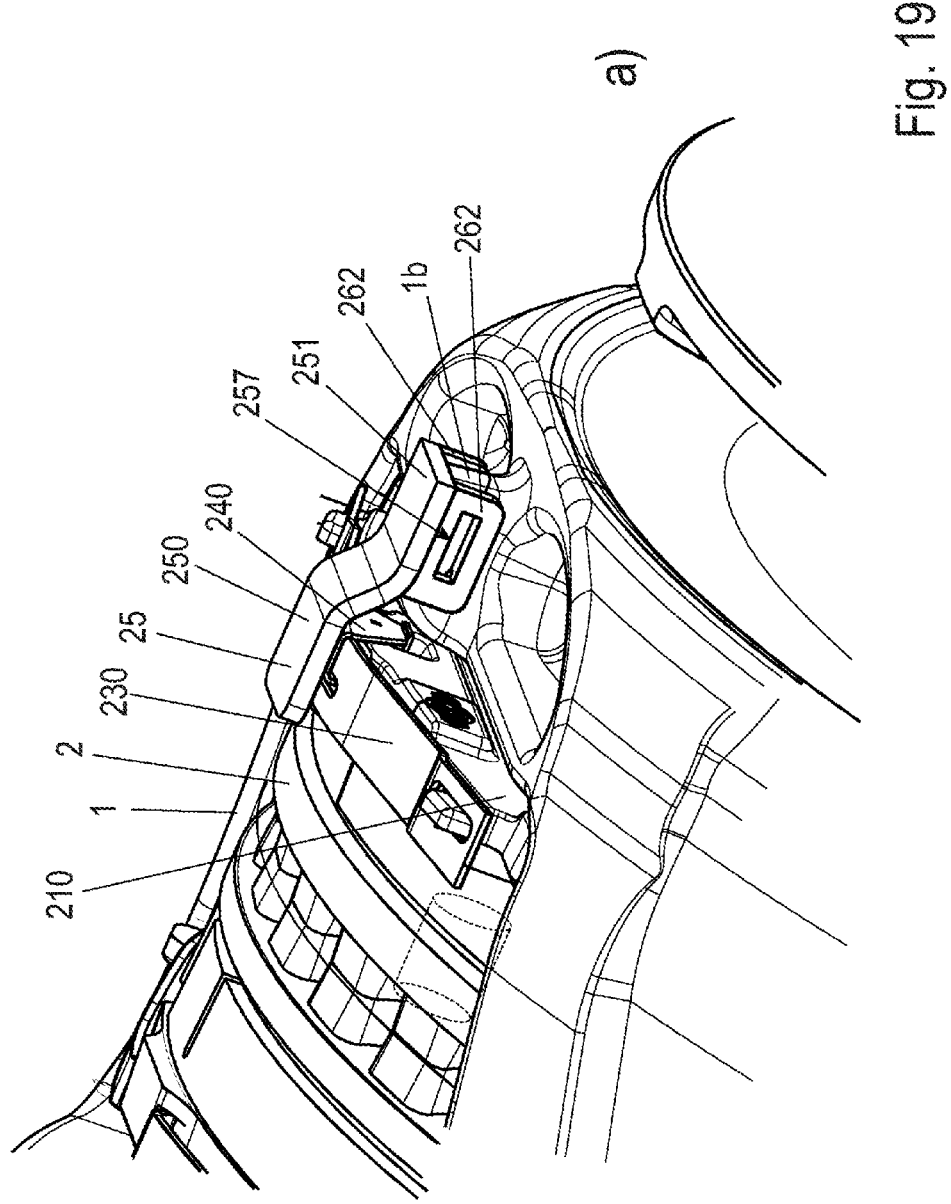

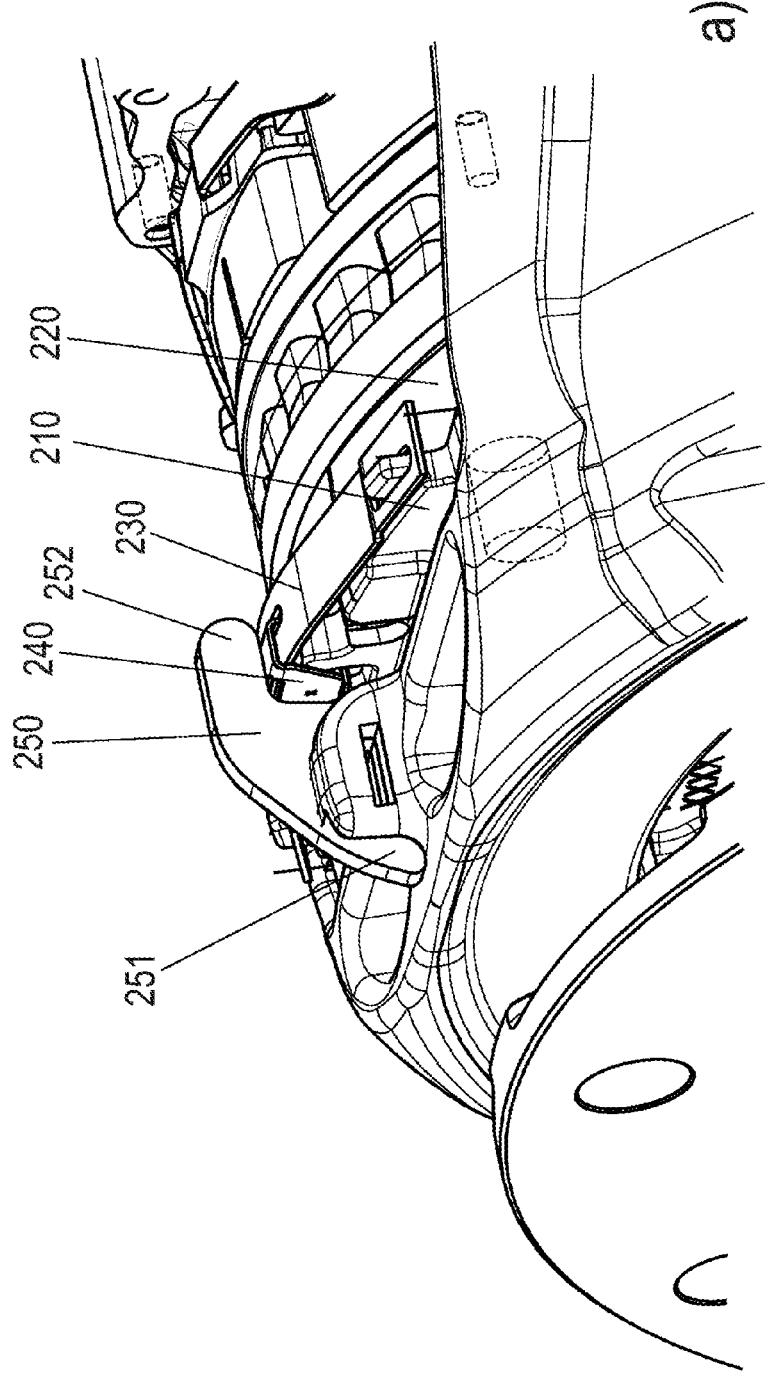

b)

d)

DISC BRAKE FOR A COMMERCIAL VEHICLE, BRAKE PAD, AND BRAKE PAD SET

CROSS REFERENCE TO RELATED APPLICATIONS

This application is a continuation of PCT International Application No. PCT/EP2017/060583, filed May 3, 2017, which claims priority under 35 U.S.C. § 119 from German Patent Applications No. 10 2016 109 360.2, filed May 20, 2016, 10 2017 105 641.6, filed Mar. 16, 2017, and International Application No. PCT/EP2017/057857, filed Apr. 3, 2017, the entire disclosures of which are herein expressly incorporated by reference.

BACKGROUND AND SUMMARY OF THE INVENTION

The invention relates to a disk brake for a utility vehicle.

In the case of a generic disk brake designed in particular as a sliding caliper brake, in a braking situation, an action-side brake pad is pressed against a brake disk on the vehicle by way of an application device, which is actuatable pneumatically or by electric motor. During the further course of the braking process, the brake caliper is, in relation to the brake disk, displaced counter to the application direction of the action-side brake pad, with the opposite, reaction-side brake pad being driven along and pressed against the other side of the brake disk.

With regard to the prior art, DE 40 20 287 A1 is firstly mentioned. According to said document, in each case one pad spring designed as a leaf spring is provided on the two brake pads. The pad carriers, after being inserted into their pad slot, are in each case held by way of the pad spring, which pad springs are in turn, in the mounted position, secured jointly by way of a holding clip which acts on the leaf spring from the top side and which extends in a transverse direction with respect to the longitudinal axis of the leaf spring. For the fixing of the pad spring, lugs provided with undercuts are integrally formed on the pad carriers (or the pad carrier plate), which lugs extend through slot-like recesses in the pad spring, which recesses in this case engage behind the undercuts, such that a form fit is realized by way of which the pad spring is held in a radial direction, specifically such that they are prevented from being released of their own accord in a relaxed or partially relaxed state. Further similar prior art is presented in DE 14 2014 106 090 A1. According to said documents, the brake caliper has in each case one central caliper opening over the brake disk, through which the two brake pads are insertable into the pad slots, which permits a simple exchange of the brake pads. On the other hand, it makes this necessary. The brake pads in the pad slots are also easy to secure radially—outward in relation to the brake disk axis of rotation in the context of this application.

In the case of fixed-caliper brakes, this problem does not exist in this form, because, there, a strut is generally led across the brake disk, which strut may duly have a ventilation opening but, owing to its dimensioning, is not envisaged and designed with regard to a pad change. A pad retaining clip which extends over the caliper opening is thus not required.

The solution described in the introduction is further developed in each case in the patents EP 1 963 702 B1 and EP 2 255 101 B 1. By way of these solutions, by way of a cover which is fixed to the pad carrier and which is preferably radially movable relative thereto and which is extended through by the pad spring or by a part of the pad spring, it is achieved that the pad spring is always reliably braced in a load-transmitting fashion in particular in the loading region.

With regard to the technological background, the documents EP 0 694 134 B1, DE 10 2012 110 461 A1 and WO 2014/079 869 A1 are also cited.

The invention is based on the object of further developing a disk brake of the generic type such that good braking characteristics are achieved with structurally simple means. A further object consists in providing a corresponding brake pad and a corresponding brake pad set.

This and other objects are achieved by way of a disk brake, a brake pad set, and/or a method in accordance with the embodiments of the invention.

A disk brake for a utility vehicle is provided, having a brake caliper which engages over a brake disk and which is preferably designed as a sliding caliper and which is arranged on a positionally fixed brake carrier, and having an application device for applying the brake, two brake pads which each have a pad carrier and a friction pad fastened to said pad carrier and of which one, as an application-side brake pad, can be pressed by way of the application device against the brake disk on one side of the brake disk and of which the other, as a reaction-side brake pad, is arranged on the opposite side of the brake disk and which are each inserted into a pad slot of the brake carrier. The brake caliper has a central caliper opening over the brake disk, through which caliper opening the two brake pads can be inserted into the respective pad slot of the brake carrier. A hold-down clip is provided which is designed so as to radially secure only the reaction-side brake pad of the two brake pads in its pad slot in the brake carrier, wherein the hold-down clip is, with its end averted from the brake pad, held on the brake caliper, and wherein the application-side brake pad is secured radially in the brake carrier in its pad slot by way of a form fit.

Firstly, in this way, an advantageous disk brake and a particularly advantageous reaction-side brake pad and an associated hold-down clip are created, the latter having a simple and short structural form which is advantageously limited to the function of holding down the radial brake pad. The short hold-down clip leads to a weight and cost reduction of the brake owing to the reduced use of material. This is supplemented by an advantageous arrangement of the application-side brake pad in its pad slot in the brake carrier, where said brake pad is secured radially in a simple manner by way of a form fit —in particular by way of lateral projections. The two brake pads are thus secured radially differently in a simple and effective manner in the brake carrier, whereby the disk brake as a whole is further developed and optimized in an advantageous manner. The application-side brake pad additionally, by way of its design, reduces the effect of oblique wear.

In one advantageous refinement, the application-side brake pad may have a pad spring which—preferably in a central region —is held or secured on the application-side brake pad and which has ends which lie resiliently on brake carrier horns of the brake carrier, such that the application-side brake pad is preferably pulled radially upward in its pad slot in the brake carrier. In this way, the application-side brake pad is pulled radially outward in the pad slot (away from the brake disk axis of rotation) by the pad spring, such that said brake pad is seated in a particularly effective and secure manner in the pad slot.

According to an embodiment of the invention, an advantageously simple method for mounting the brake pads in a disk brake as claimed in one of the claims relating thereto is also provided, in which a) the reaction-side brake pad is inserted radially into its pad slot in the brake carrier, wherein said reaction-side brake pad is then radially secured there by way of a hold-down clip which is arranged on the brake caliper, b) the application-side brake pad is firstly introduced or inserted radially into the disk brake and is then, by way of an axial movement, moved into a position in the pad slot, assigned thereto, of the brake carrier in which said application-side brake pad is secured there radially by way of a form fit between the application-side brake pad and the brake carrier, and c) wherein furthermore, the ends of a pad spring, which is secured on the application-side brake pad, are placed onto brake carrier horns of the brake carrier so as to lie resiliently on said brake carrier horns of the brake carrier.

In particular, the mounting of the application-side brake pad is thus very simple. Each of the two brake pads is mounted in a simple and secure manner in its pad slot.

It is advantageous that the hold-down clip engages over only one of the two brake pads entirely or partially axially parallel with respect to the brake disk in order to secure said brake pad. In this way, said pad is, as it were, held radially "from above" in the pad slot of the brake carrier or of the brake caliper and secured against (excessively large radial) movements. Here, the radially secured or held-down reaction-side brake pad is insertable into a pad slot of the brake carrier. In a particularly preferred embodiment, both brake pads are arranged in pad slots of the brake carrier and can be inserted through the opening in the brake caliper —which for the brake pads is a mounting opening—into said pad slots, specifically substantially radially from above, and possibly additionally by way of a relatively small axial movement. A brake carrier with pad slots on both sides of the brake disk is very stable and advantageous. The pad slot supports the pad in the circumferential direction and radially downward toward the brake disk. Upwardly, the axially "short" hold-down clip then secures the one brake pad so as to prevent it from falling out and from performing excessively large radial movements, possibly with assistance from an interposed spring. The other brake pad is radially secured in another advantageous manner —not by the same hold-down clip.

Securing of the reaction-side brake pad with the "short" hold-down clip has the advantage that it is easy to realize, in particular if said reaction-side brake pad is held axially immovably in the brake caliper and, during braking operations, is not displaced relative to the brake caliper in particular in the region of its back plate or pad carrier plate.

Here, in variants, the hold-down clip may be releasably or non-releasably fastened to the brake caliper or formed in one piece therewith.

An optional embodiment of the hold-down clip with said brake pad as a structural unit is advantageous, which structural unit is exchanged as a whole during a pad change. This is simple and leads to a simple and reliable renewal of all elements to be exchanged in the "reaction-side pad" structural unit (brake pad, pad spring, if provided: cover and hold-down clip).

The hold-down clip may lie on the pad carrier or engage behind, and thus interact with, said pad carrier. Said hold-down clip may also interact with said pad carrier in a form-fitting fashion, and for example engage with a projection in a form-fitting fashion into said pad carrier in the region of a corresponding depression (or vice versa).

As one possible—particularly advantageous—variant, the hold-down clip may be captively connected to the pad, in particular captively connected to the pad carrier. This has the advantage that said assembly is fully installed, and thus incorrect installation is ruled out. Incorrect installation means in this case that the back plate would be installed toward the brake disk.

Here, various types of connection between hold-down clip and brake pad are possible. The connection may be realized by way of a cover, wherein here, one or more lugs are provided which fully or partially engage around the hold-down clip and are subsequently mounted by way of welding, riveting, wobbling or similar methods such that dismounting is no longer possible without destruction of a component. The engaging-around configuration may be rearward, as illustrated in the sketches, or upward.

The connection may also be realized by way of a collar bolt which for example engages through the hold-down clip and is welded or riveted (in cohesive, force-fitting or form-fitting fashion) to the cover.

The connection may also be realized by way of a bolt which is fastened fixedly or displaceably in the pad back plate.

The hold-down clip may also engage partially or fully through the pad back plate. In the case of such a variant, a spring is subsequently permanently fastened to a hold-down clip, such that the hold-down clip—as already mentioned above—is captively connected to the pad.

In a further concept, the pad retaining spring may be relocated away from the pad. In a region remote from the pad, the prevailing temperatures are generally lower than directly at the pad, which has a positive effect on the service life and on the greater possibilities for selection of spring materials. Since the springs are protected against corrosion with a coating, in the case of which the temperature likewise has an effect on service life, an improvement could also be realized here. The hold-down clip is in this case connected fixedly, or with play for tolerance compensation, to the pad. In this case, the spring pushes the hold-down clip downward. By way of the hold-down clip, the pad is pushed downward onto the brake carrier. This spring action may be realized by way of different spring designs, for example leaf spring, spiral spring, leg spring, etc.

Arresting or holding of the hold-down clip on the pad and/or on the brake caliper may be realized easily by one or more fastening means, in particular bolt(s) or bracket(s) or one or more screws.

It is thus contemplated, and advantageously simple, for the hold-down clip to be non-releasably fixed to a part of the reaction-side brake pad. It may for example also be cohesively fastened to the pad carrier, for example by welding.

The invention also provides an advantageous brake pad for a disk brake as claimed in one of the claims relating thereto, which brake pad has a pad carrier and a friction pad fastened thereto, which brake pad is designed for interacting with the hold-down clip. The hold-down clip and the brake pad may —though need not imperatively —form a structural unit here.

Here, the hold-down clip is designed such that it radially secures only the reaction-side brake pad in its pad slot on a disk brake.

Here, it is particularly advantageous that the hold-down clip is fixed to the reaction-side brake pad, because said reaction-side brake pad is axially fixed in the brake caliper and is not displaced therein with increasing wear. The invention can thus be easily realized here. The invention is however not restricted to this variant.

In a further advantageous variant, a cable bridge is provided on which at least one signal cable is arranged and held, which cable bridge bridges the opening of the brake caliper and is fastened directly or indirectly to the brake caliper in at least two regions. In this way, despite the "short" hold-down clip, a signal cable can be laid across the opening of the brake caliper in an effective manner.

Also provided is a brake pad set having a reaction-side brake pad, having a reaction-side brake pad and having an application-side brake pad, wherein the application-side brake pad is secured radially in the brake carrier by way of at least one form-fit element on the pad carrier and has a pad spring which is secured on the application-side brake pad, and wherein the pad spring has ends which are designed to lie resiliently on brake carrier horns of an associated brake carrier, and in that the reaction-side brake pad is designed for interacting with a hold-down clip, which hold-down clip is designed such that it radially secures only one of two of the two brake pads in its pad slot on a disk brake.

In this way, the application-side brake pad on the application side requires no hold-down clip for radial securing purposes. Furthermore, said pad reduces the effect of oblique wear. According to one realization of the invention, the reaction-side pad need not imperatively also have this structural form. Said reaction-side pad may rather also be designed without projections. Then, the "short" hold-down clip is particularly advantageous. Altogether, in this way, a very inexpensive disk brake is created which has two brake pads optimally adapted to their tasks as pad set.

Summarized briefly, what is also advantageously provided is a disk brake for a utility vehicle, having a brake caliper which engages over a brake disk and which is preferably designed as a sliding caliper and which is fastened to a positionally fixed brake carrier and has a central caliper opening above the brake disk, having an application device for applying the brake, and having two brake pads which can be inserted through the caliper opening and each have a pad carrier and a friction pad fastened to said pad carrier and of which one, as an application-side brake pad, can be pressed by way of the application device against the brake disk on one side of the brake disk and of which the other, as a reaction-side brake pad, is arranged on the opposite side of the brake disk. A hold-down clip is provided which is designed so as to radially secure or hold down only one of the two brake pads radially relative to the brake disk axis of rotation in the pad slot.

The present invention relates, in a refinement of the variants discussed above, and in an embodiment which is also to be considered inventive independently, to a disk brake having an advantageous brake carrier. Generic brake carriers for disk brakes, which are actuatable pneumatically or by electric motor, of utility vehicles have substantially an attachment region which for fixing to a vehicle axle, for example by screw connection to an axle flange of a vehicle axle of said type, and a pad slot for receiving and supporting at least one brake pad. Here, the pad slot is formed by a bridge with bearing surfaces for radially supporting the brake pad and by carrier horns which project from said bridge. The carrier horns laterally guide the respective brake pad and, during a braking process, absorb the braking forces transmitted from a brake disk to the brake pad. Also known are brake carriers which engage over the brake disk and which have two pad slots for receiving an application-side brake pad and a reaction-side brake pad. Here, the application-side brake pad is defined as that brake pad which is moved or driven directly by an application unit of the disk brake. Here, furthermore, the reaction-side brake pad is defined as the second brake pad which, after the application-side brake pad has been pressed against the brake disk, is pressed against the reaction-side friction surface of the brake disk as a result of a movement of the brake caliper.

For the mounting of a brake pad in a pad slot of said type of a brake carrier, the brake pad is inserted radially with respect to the axis of rotation of the brake disk along the inner surfaces of the carrier horns into the pad slot of the brake carrier. If the inner surfaces of the carrier horns are of planar design and the geometry of the pad slot is substantially rectangular, this permits a very simple insertion of the brake pad from above through a pad slot opening of a brake caliper of the disk brake directly into the pad slot.

Such an arrangement however necessitates an additional holding or securing system of the pad or of the brake pads, in particular for the radial fixing of the brake pads in order to secure them against falling out, for example in the form of a pad-holding clip which engages over the pad slot opening of the brake caliper in the direction of the axis of rotation of the brake disk.

In the case of a brake carrier in which the carrier horns are designed such that one or both of the brake pads are fixed in a radially form-fitting fashion to one or both of the respective carrier horns, it is necessary, after a first radial movement through the opening of the brake caliper, for the respective one of the brake pads to firstly be moved axially parallel to the vehicle axle in the pad slot until respective projections on the side walls of the brake pads and corresponding recesses on the inner sides of the carrier horns of the brake carrier overlap, such that the brake pad reaches a sliding-in position in which the brake pad can subsequently be pushed into the pad slot in the direction of the axis of rotation of the brake disk. Such a brake carrier is known for example from DE 10 2015 114 351 A1.

During the mounting in particular of the application-side brake pad which is concealed by the disk brake, it is desirable if the positioning during the installation process can be carried out as easily and quickly as possible.

It is thus an object of a further development of the variants discussed above, and also of an independent invention, to provide a disk brake having a brake carrier on which the installation of brake pads is further simplified.

Said object is achieved by way of a disk brake having a brake carrier in accordance with embodiments of the invention.

The brake carrier for a disk brake, which can be actuated pneumatically or by electric motor, of a utility vehicle then has an attachment region for fixing to a vehicle axle, at least one pad slot for receiving and supporting at least one brake pad.

The pad slot is formed by an entry-side carrier horn, an exit-side carrier horn and a bridge which connects the entry-side carrier horn and the exit-side carrier horn. Here, regions of the bridge adjoining the carrier horns form bearing surfaces for radially supporting the brake pad.

On a side surface of the carrier horns, there are arranged respective guide contours for guiding the brake pad into a sliding-in position to the side of the pad slot, in which position the brake pad can be slid, axially with respect to the vehicle axle, into the pad slot between the carrier horns.

With a brake carrier of said type, a facilitated orientation of a brake pad to be inserted into the pad slot of the brake carrier is made possible, because exactly central positioning of the brake pad is forced by the guide contour.

If, during the insertion in a radial direction, the brake pad is initially located with a lateral offset, a side edge of a pad carrier plate of the brake pad abuts against the guide contour and is guided along the guide contour into its correct sliding-in position.

Dependent claims relate to advantageous design variants of the invention.

In one advantageous design variant of the brake carrier according to the invention, the bearing surfaces for radially supporting the at least one brake pad are laterally enlarged by a mounting region for limiting the sliding movement of the brake pad into the sliding-in position to the side of the pad slot. This makes it possible in a simple manner for the brake pad to be slid into the sliding-in position, in which the brake pad can be pushed parallel to the axis of rotation of the brake disk in the pad slot.

In one preferred design variant of the invention, the guide contours are integrally formed, as material thickening of the carrier horns, on the side surfaces of the carrier horns. The guide contours can thus be integrally formed on the carrier horns in a simple manner during the casting process of the brake carrier.

Here, the guide contours are preferably shaped so as to converge on one another toward the bridge.

The guide contours particularly preferably each have at least one rectilinear guide region which makes it possible for the respective brake pad, in the case of initially laterally offset positioning, to be guided into the exactly central position.

In the case of a brake carrier in which, on respective inner sides of the carrier horns, there are integrally formed projections which serve for radially securing the brake pad with correspondingly shaped pad carrier plate with lateral recesses, it is preferable if, below the projections, there is integrally formed in each case one receptacle for receiving a respective projection of the pad carrier plate. The guide contours end in each case at a side edge of the respective receptacle.

In this way, the brake pad can always be guided along one of the guide contours into the correct sliding-in position.

The disk brake according to an embodiment of the invention has a displaceable brake caliper which engages over a brake disk, and brake pads which are arranged to both sides of the brake disk in a pad slot of a brake carrier, said brake pads having a pad carrier plate and a friction pad fastened to said pad carrier plate.

The brake pads are, at the entry side and exit side, held in form-fitting fashion radially with respect to the axis of rotation of the brake disk on carrier horns of the brake carrier, wherein the brake carrier is designed as described above.

It is preferable for only the application-side carrier horns to have the guide contours for guiding the brake pad into a sliding-in position to the side of the pad slot.

In particular during the mounting of the application-side brake pads, exact orientation is generally impeded owing to a visual obstruction by the brake disk, such that, here, the proposed guide contours greatly facilitate the mounting process.

Further advantageous embodiments of the invention are characterized in dependent claims.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a view from FIG. 1A with brake caliper partially omitted.

FIG. 18 is a perspective view of a part of a fourth further disk brake according to an embodiment of the invention.

DETAILED DESCRIPTION OF THE DRAWINGS

Figure 1A:
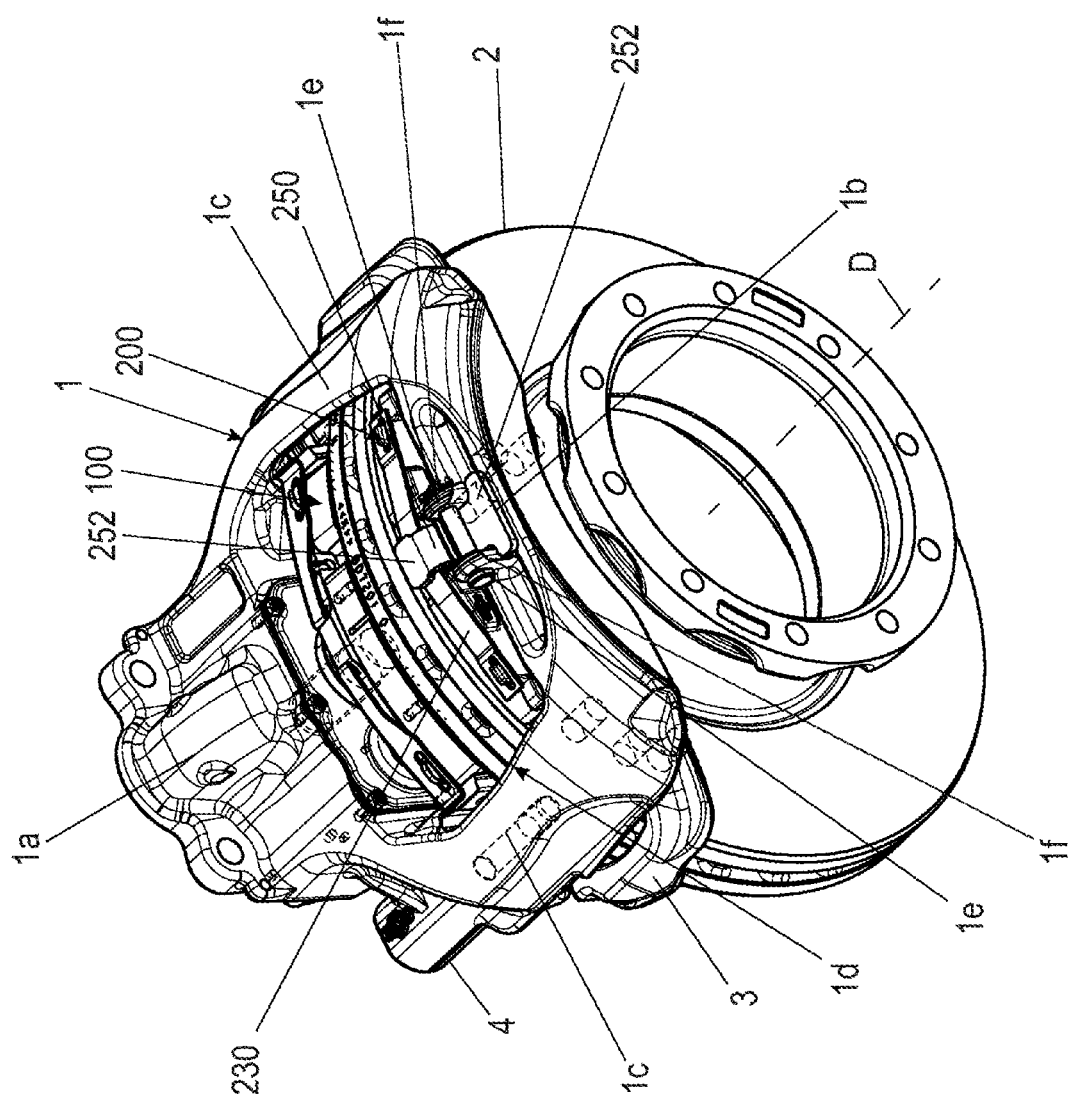
FIG. 1A is a perspective view of a first disk brake according to the invention and, FIG. 1B is a view of a brake carrier of the disk brake from FIG. 1A.

FIGS. 1A and 2 and also 9 and 10 show in each case a disk brake for a utility vehicle. The disk brake has a brake caliper 1 which engages over a brake disk 2. Not illustrated is an associated electric or pneumatic actuator (for example a brake cylinder). The brake disk 2 has a brake disk axis of rotation D. The brake caliper 1 is arranged on a brake carrier 3. Here, the brake caliper 1 is, in a preferred refinement, arranged on the brake carrier 3 so as to be displaceable axially in relation to the brake disk 2 in the direction of the brake disk axis of rotation D (to which expressions such as "axial" and "radial" relate here). For this purpose, the brake caliper 1 is mounted on guide beams 4 (not visible here in detail) which are connected to the brake carrier 3 held positionally fixedly on the vehicle.

The brake caliper 1 includes an application section 1a, a caliper rear section 1b and two tension struts 1c. The application section 1a accommodates an application device (not shown) of the disk brake 1.

The application section 1a runs with a side parallel to the plane of the brake disk 2 on one side of the brake disk 2. The caliper rear section 1b is arranged, likewise so as to run parallel to the brake disk 2, on the other side of the brake disk 2. The caliper rear section 1b is connected to the application section 1a at in each case one end by way of in each case one tension strut 1c. The tension struts 1c run in this case substantially at right angles to the application section 1a and to the caliper rear section 1b.

In this arrangement, the application section 1a, the caliper rear section 1b and the tension struts 1c define a central opening 1d between them, which opening spans the brake disk 2. The opening 1d has an imaginary longitudinal central line which lies in the plane of the brake disk 2 and which connects the imaginary centers of the tension struts 1c. Furthermore, the opening 1d has a further imaginary transverse central line which connects an imaginary center of the application section 1a to an imaginary center of the caliper rear section 1b.

Figure 9:
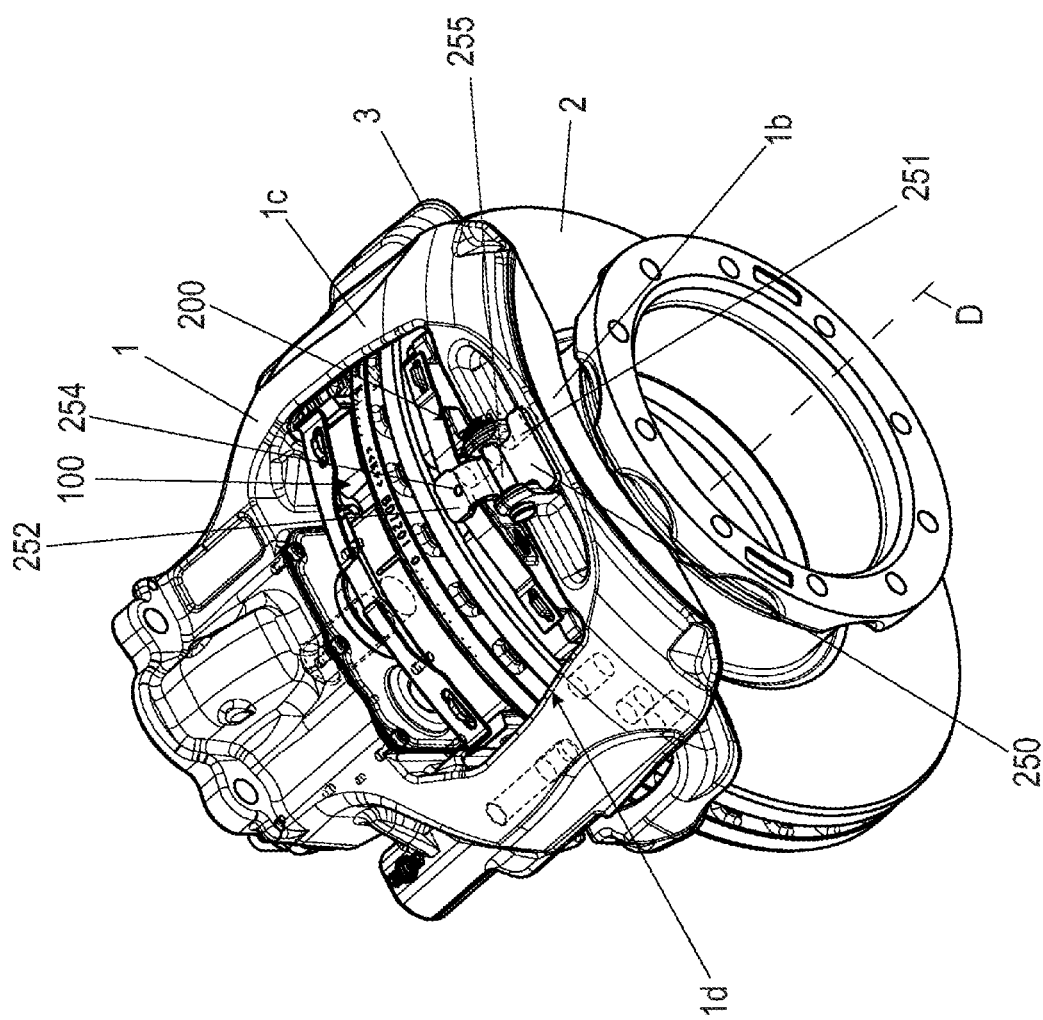
FIG. 9 is a perspective view of a second disk brake according to an embodiment of the invention.
Figure 10:
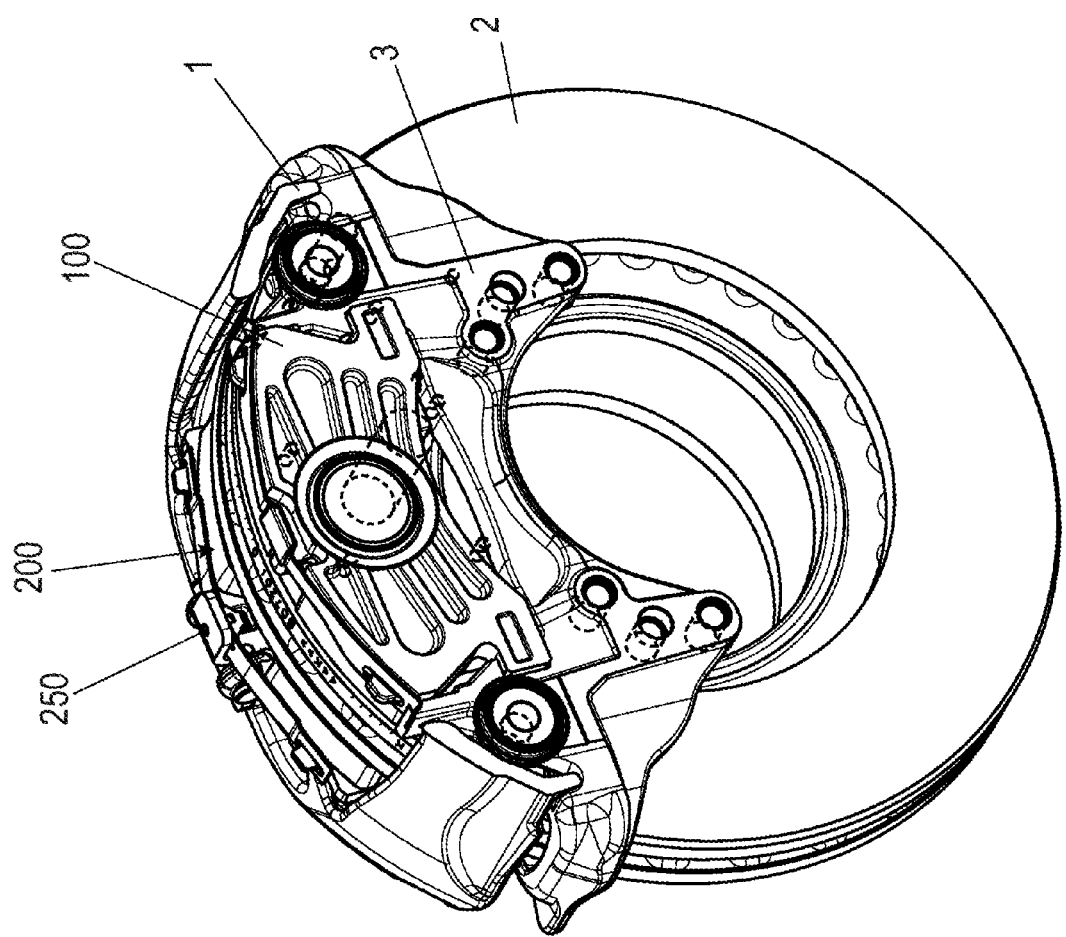
FIG. 10 is the view from FIG. 9 with brake caliper partially omitted.

To both sides of the brake disk 2, there is provided in each case one brake pad 100, 200 (not illustrated in FIG. 9). One brake pad 100—hereinafter also referred to as application-side brake pad 100—is arranged on the side of an application device. The further brake pad 200—hereinafter also referred to as reaction-side brake pad 200—is arranged on that side of the brake disk 2 which is situated opposite the application side.

The central caliper opening 1d over the brake disk is designed or dimensioned such that the two brake pads can be inserted through the caliper opening into the brake carrier, which permits a simple pad change.

A braking operation is performed by way of the application device arranged in the application section 1a of the brake caliper 1, in a receiving space therein, said application device having a brake lever which is positioned in a dome, or in the application section 1a, of the brake caliper 1. The application device is actuated by an actuator (not illustrated). Said application device is preferably pneumatically actuated, or electromechanically. For this purpose, it is preferably equipped with a brake cylinder, which may be arranged on the brake caliper of the disk brake (not illustrated here).

The two brake pads 100, 200 can be pressed against the brake disk 2 at both sides during braking operations. In the case of an embodiment as a sliding caliper brake, during a braking operation, the application-side brake pad 100 makes contact with the brake disk 2. During the further course of the braking operation, reaction forces that arise cause the brake caliper 1 to be displaced in the opposite direction, driving the reaction-side brake pad 200 along until it likewise comes into frictional contact with the brake disk 2.

Each of the brake pads 100, 200—see FIGS. 3, 4 and 11 and 16—has in each case one pad carrier 110, 210 and one friction pad 120, 220 fastened thereto on the side facing toward the brake disk 2, which friction pad is, in its function, that is to say during a braking operation, pressed against the brake disk 2.

The brake pads 100, 200 are accessible through the central opening 1d for an exchange and for maintenance. They can be inserted "from above" radially through said central opening 1d into associated pad slots and removed from the latter again. The expressions "above" and "below" will be used in this sense below.

Figure 1B:
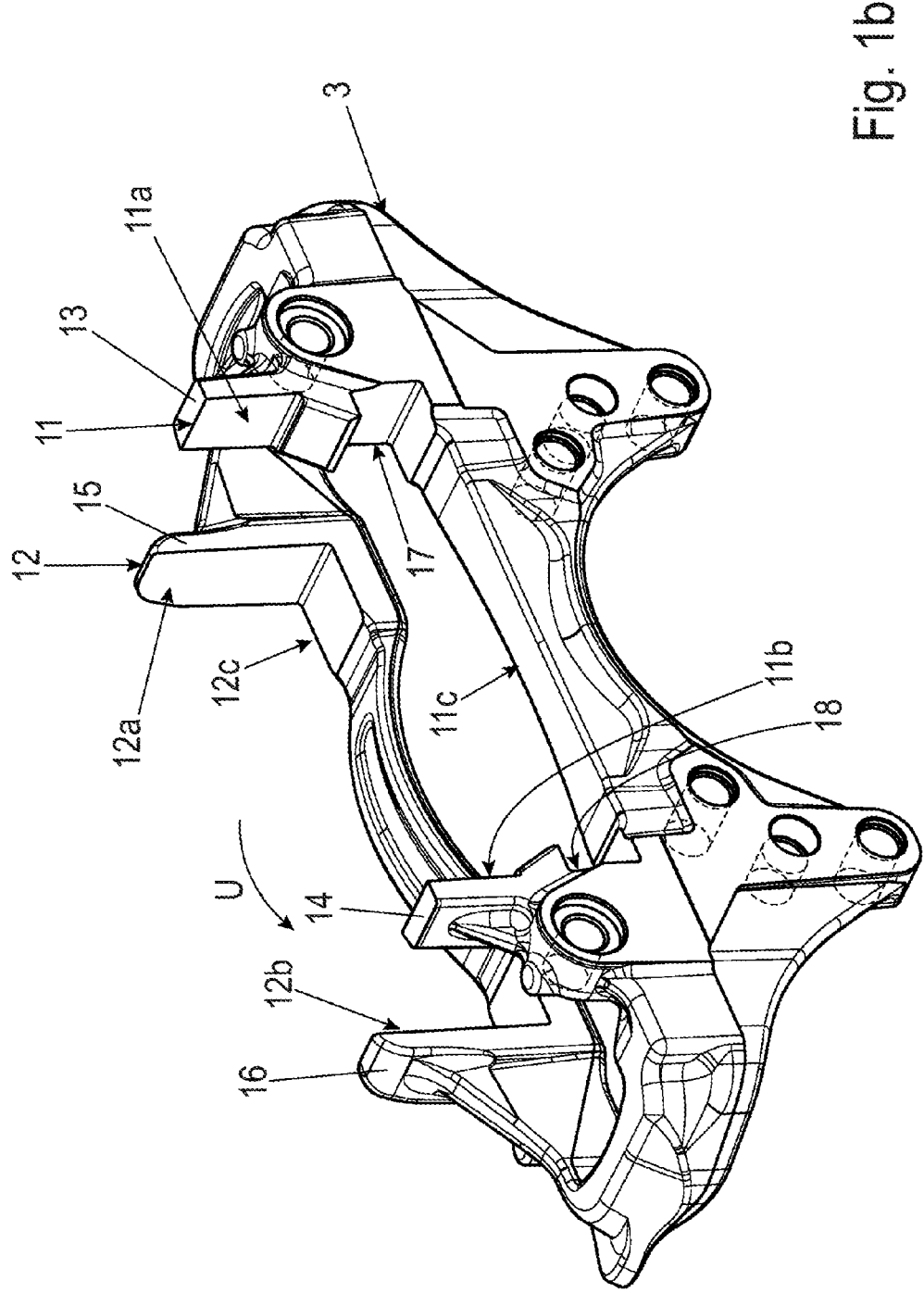

An application-side pad slot 11 for the application-side brake pad 100 is formed in the brake carrier 3 on the side of the application device or in an application-side section of the brake carrier. This can be seen in FIG. 1B.

Provision is made by the brake carrier 3 engages in the manner of a frame around an upper edge region of the brake disk 2 and has an application-side section and a reaction-side section. Then, a second pad slot 12 for the reaction-side brake pad is preferably also formed in the brake carrier 3 (on the reaction side, see FIGS. 1a and b). The reaction-side pad slot 12 for the reaction-side brake pad 100 may however alternatively also be formed in the brake caliper 1 (if the brake carrier has only an application-side section and no reaction-side section; not illustrated here).

The pad slots 11, 12 are (see FIGS. 1A and 1B) delimited in each case laterally (or in the direction of rotation U and counter to the direction of rotation U) by support surfaces 11a, 11b; 12a, 12b on brake carrier horns 13, 14 and 15, 16 respectively, and have in each case a pad slot base 11c, 12c which is formed between the brake carrier horns 13 and 14 or 15 and 16 respectively.

The application-side brake pad 100 and the reaction-side brake pad 200 are in this case of different design. Here, the application-side brake pad 100 may in turn be designed in a variety of ways. The illustration selected in FIGS. 2 and 3 is thus particularly advantageous but not imperative.

Figure 3:
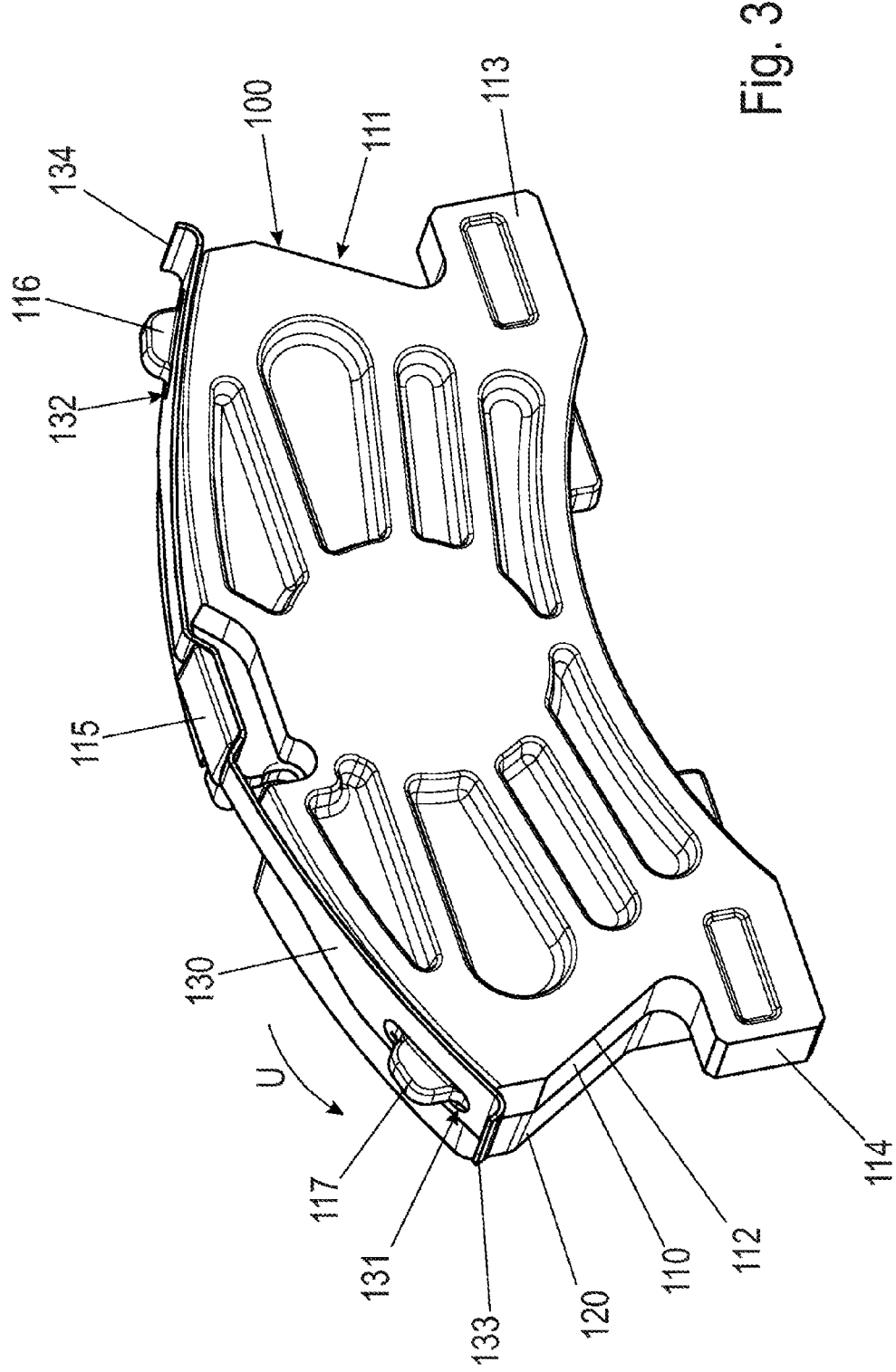
FIG. 3 is a perspective view of an application-side brake pad of the disk brake from FIG. 1 (and of the disk brake from FIG. 9).

The application-side brake pad 100 of FIGS. 2 and 3 (suitable for the brake of FIG. 1 and of FIG. 9) has the pad carrier 110 and the pad material 120 arranged thereon on one side, which pad material is directed, in the installed state, toward the brake disk 2. The pad carrier 110 has, in turn, two side edges 111, 112 which lie parallel to the associated support surfaces of the brake carrier horns 13, 14. In relation to the preferred direction of rotation U (corresponding to forward travel), one side edge 111 is configured as an exit side, and thus serves as a support surface during braking operations from the forward travel direction. In relation to the preferred direction of rotation U (corresponding to forward travel), the further side edge 112 is configured as an entry side. It thus serves as a support surface during braking operations from the reverse travel direction.

At the side edges 111, 112—in this case at the lower edges thereof in the pad slot 11—in each case at least one projection 113, 114 projects outward in mutually opposite directions. Each of said projections 113, 114 engages in each case into an associated undercut 17, 18 of the brake carrier 3 (see FIG. 1B), which undercuts are formed in each case in the brake carrier horns 13, 14 of the application-side pad slot 11. In this way, the installed application-side brake pad 100 is radially secured in the brake carrier 3 and is also secured against turning out during braking operations. The projections furthermore serve as further support regions during braking operations. During exchange, the new brake pad 100 is inserted radially and then displaced axially such that the projections 113 and 114 engage into the undercuts 17, 18. The undercuts 17, 18 are preferably formed in the support surfaces, which lie in the two circumferential directions, of the carrier horns of the brake carrier 3.

The application-side brake pad 100 may furthermore have a pad spring 130. Said pad spring is secured on the application-side brake pad. This is realized here as follows. The pad spring 130 engages here centrally under a holding clip 115 which is formed in one piece on the or with the pad carrier 110. The pad spring 130 is thus radially secured. The pad spring 130 furthermore has, to both sides of the holding clip, in each case one slot 131, 132 which is extended through by lugs/projections 116, 117 on the top side of the pad carrier 110. The pad spring 130 is thus secured axially and against turning out. Ends 133, 134 of the pad spring 130 preferably lie resiliently on the brake carrier horns 13, 14. By way of spring preload, the application-side brake pad 100 is thus pulled upward in its pad slot 12 in the brake carrier 3. In this way, the application-side brake pad 100 is in particular radially secured and held in the brake carrier 3 in an effective manner. Said application-side brake pad therefore does not require a hold-down clip fixed to the brake caliper. By way of the spring, rattling is also prevented in a highly effective manner.

Figure 4:
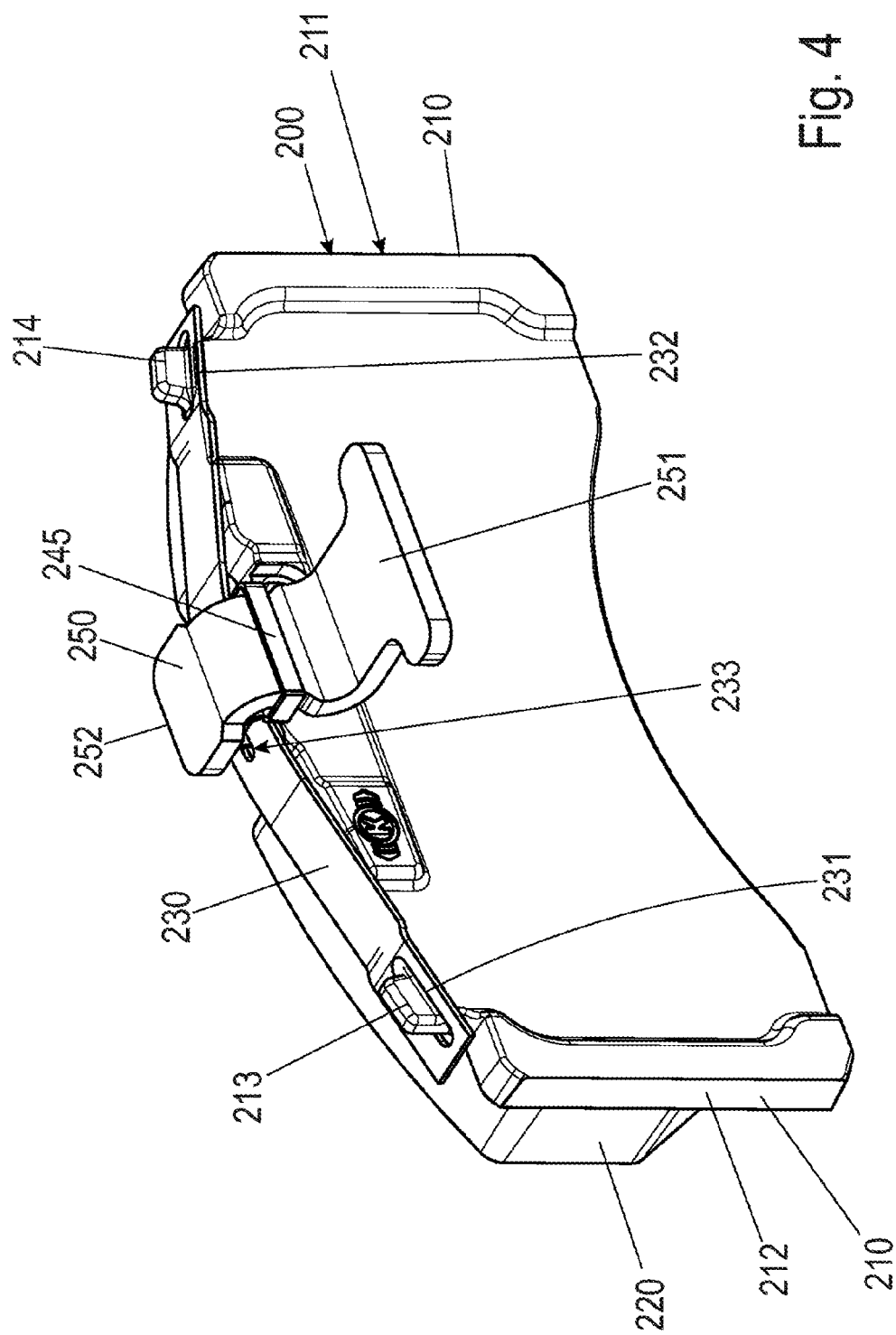
FIG. 4 is a first reaction-side brake pad with a pad spring, a cover and a hold-down clip arranged thereon.
Figure 11:
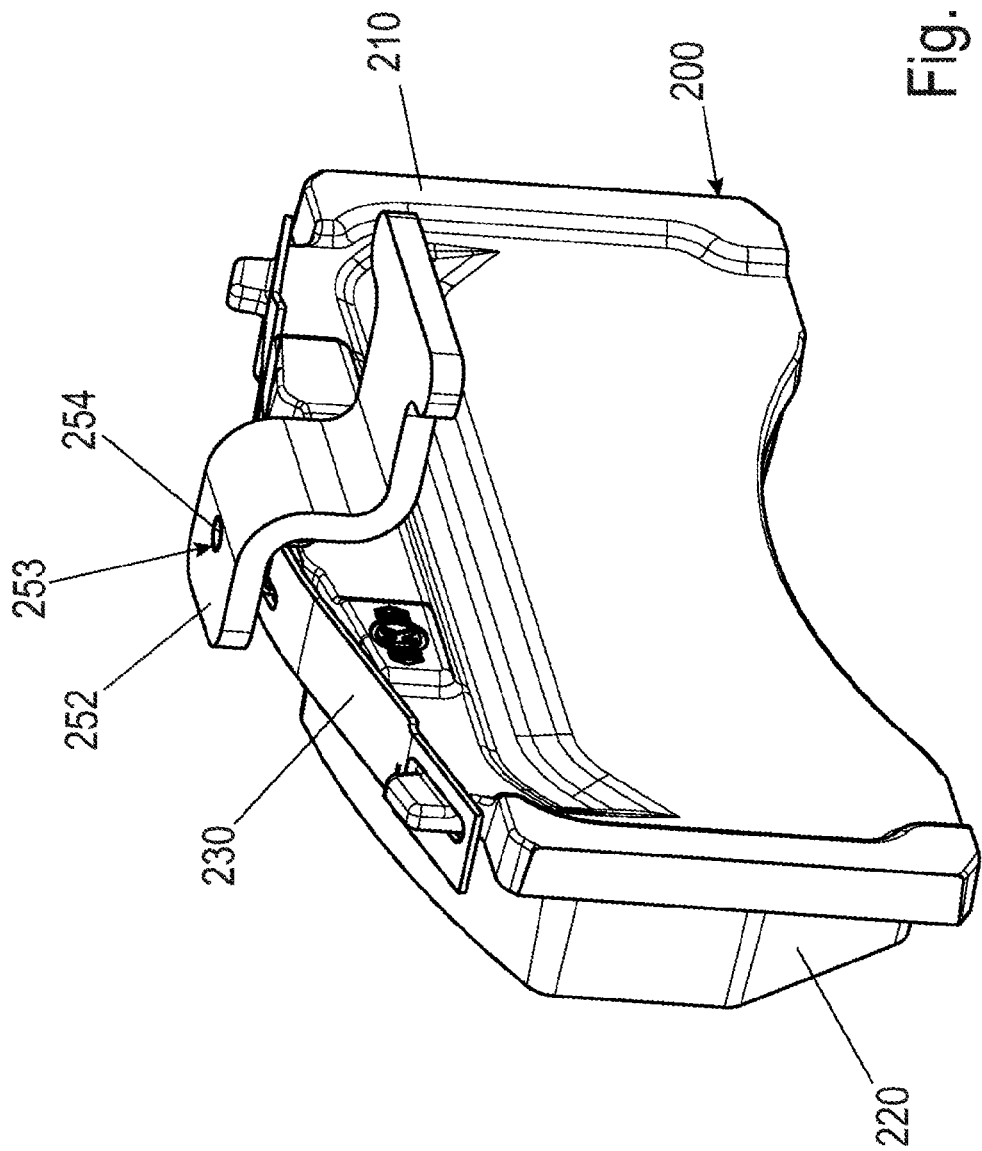
FIG. 11 is a variant of a reaction-side brake pad with a hold-down clip arranged thereon.
Figure 12:
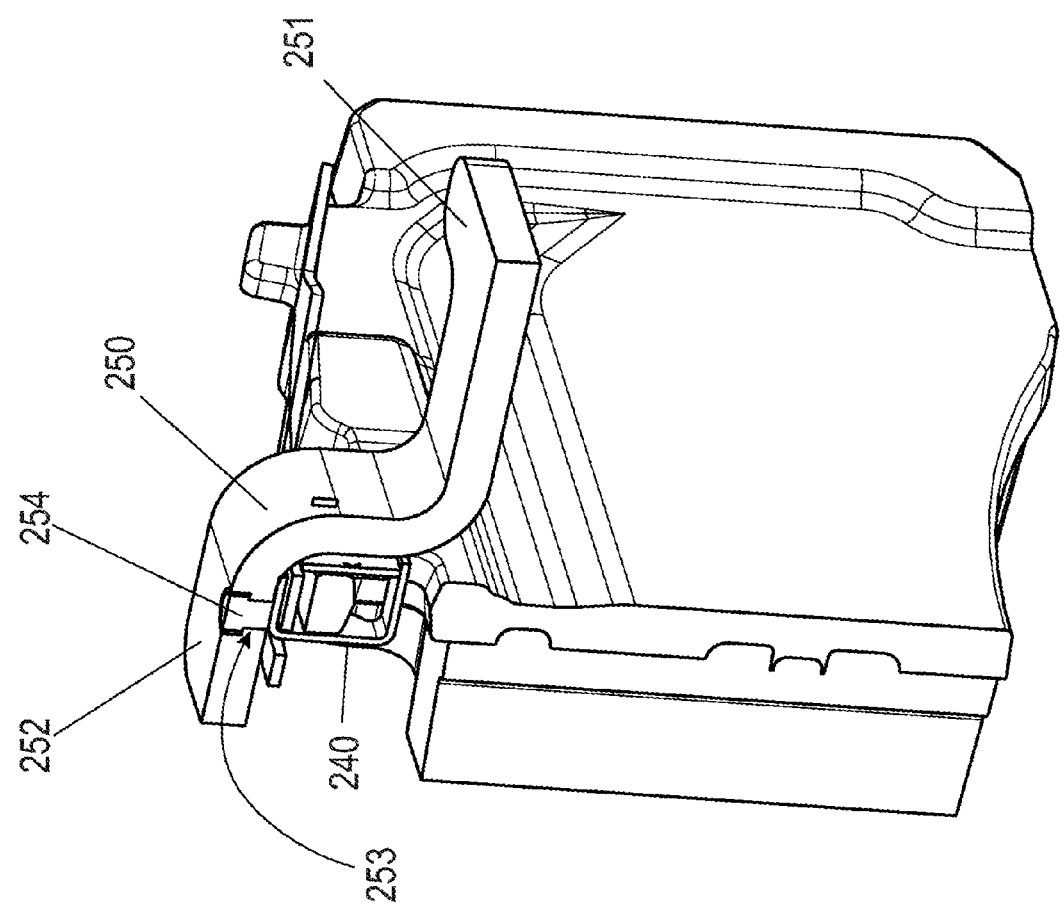
FIG. 12 is a partially sectional view of the arrangement from FIG. 11.
Figure 13:
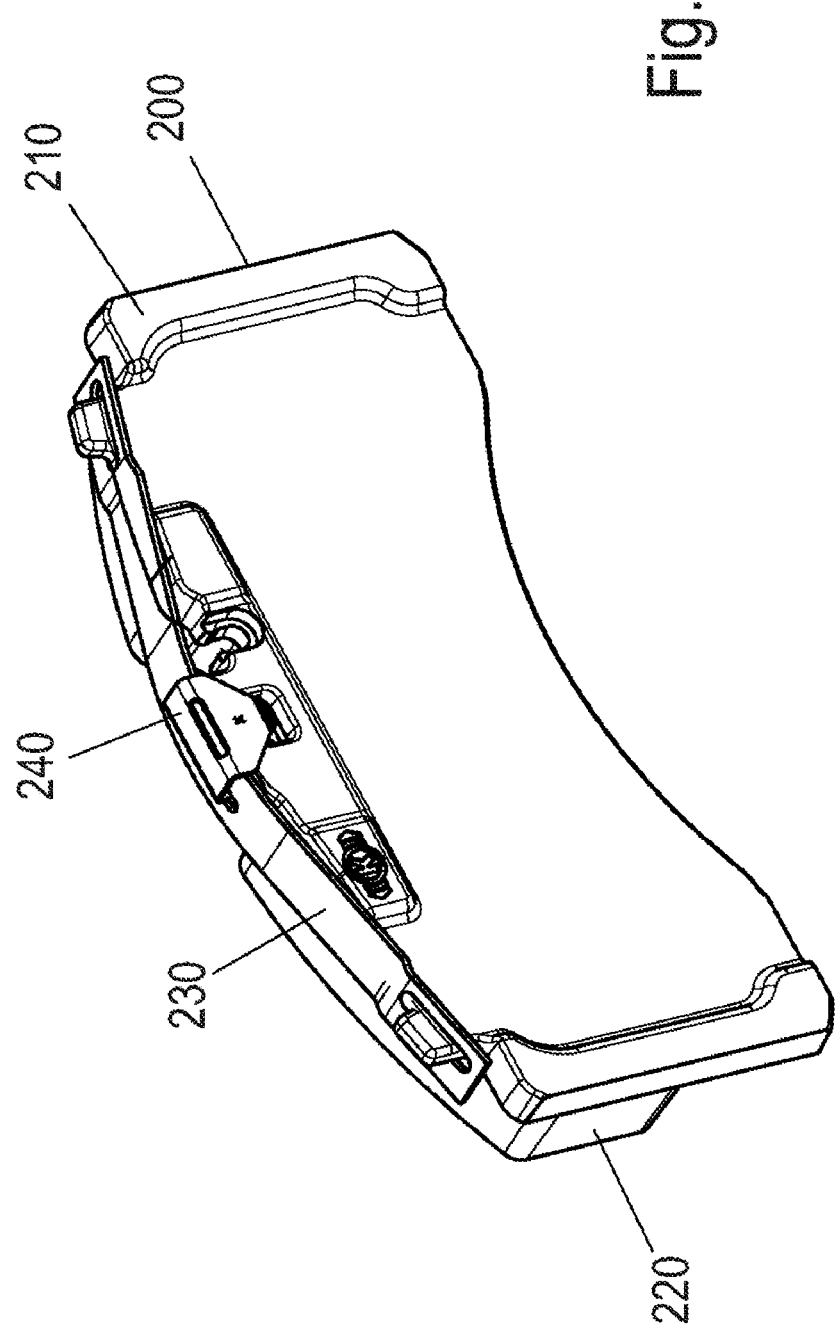
FIG. 13 is the brake pad of the arrangement from FIGS. 11 and 12.
Figure 14:
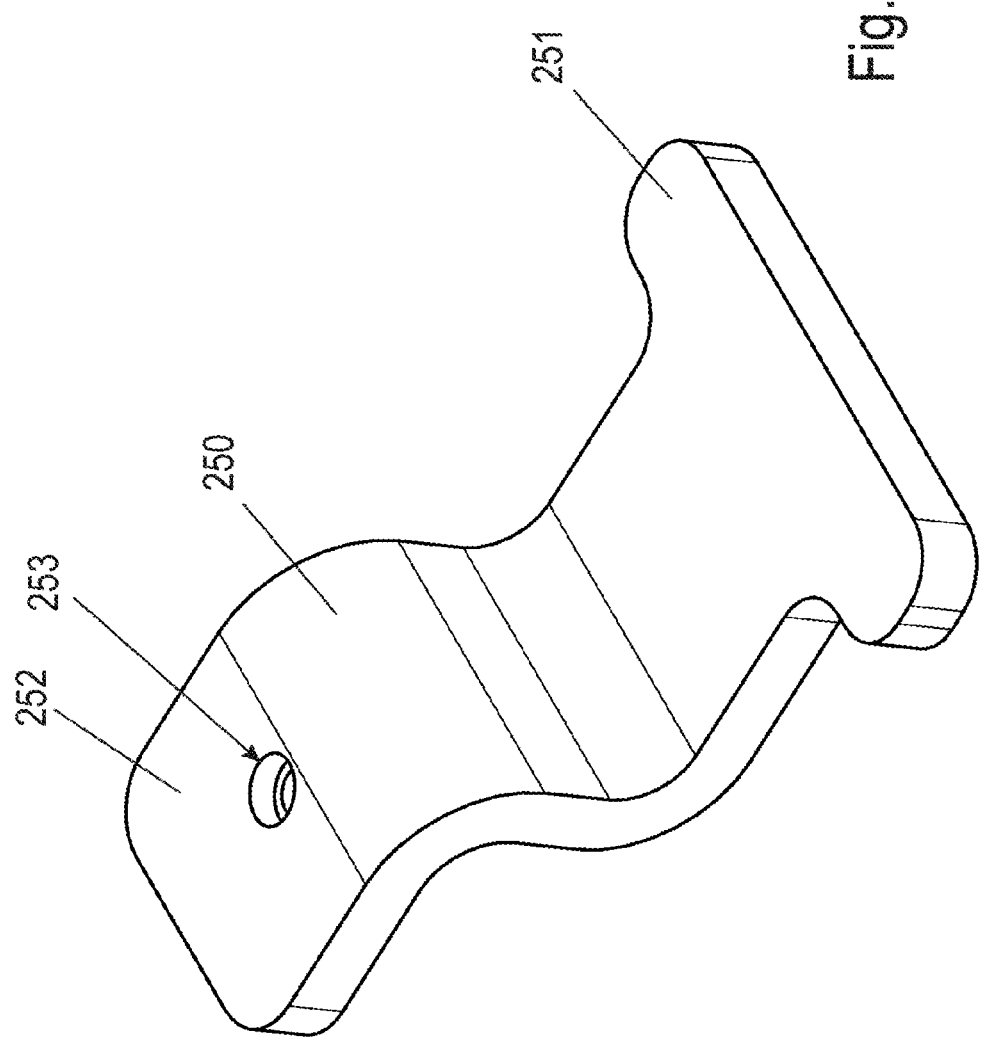
FIG. 14 is the hold-down clip of the arrangement from FIG. 11.

The reaction-side brake pad 200 of FIG. 4 or FIG. 11 has, in turn, a pad carrier 210 and the pad material 220 arranged thereon on one side, which pad material is, in the installed state, directed toward the brake disk 2.

The pad carrier 210 has, in turn, two side edges 211, 212, which in this case are oriented parallel and additionally lie parallel to the associated support surfaces 12a, b of the brake carrier horns 15, 16 of the reaction-side pad slot 12 of the brake carrier 3 (FIG. 1A).

In relation to the preferred direction of rotation U (corresponding to forward travel), one side edge 211 is in turn configured as an exit side and thus serves as a support surface during braking operations from the forward travel direction. In relation to the preferred direction of rotation U (corresponding to forward travel), the further side edge 212 is in turn configured as an entry side. It thus serves primarily as a support surface during braking operations from the reverse travel direction.

The reaction-side brake pad 200 has —see FIGS. 4 and 5 and 12, 13 and 15—a pad spring 230. At the upper longitudinal edge of the pad carrier 210, the pad-holding spring 230 is preferably non-detachably fastened to, or arranged/held on, a cover 240—FIGS. 5, 6, 8 and 12, 13 and 15. The cover 240 is preferably deflectable on the pad carrier 210 to a limited extent.

Here, at the side edges 211, 212—in this case at the lower edges thereof in the pad slot 12—of the pad carrier 210, there is in each case no projection projecting outward in mutually averted directions. This brake pad is therefore not radially secured. It therefore requires another device for radial securing in the pad slot. To secure the reaction-side brake pad 200 radially in its pad slot 12, a hold-down clip 250 is (thus) provided. Said hold-down clip may be configured in one or more pieces.

The hold-down clip 250 is fixed at one end 251 thereof to the brake caliper 1, such that said hold-down clip is not released from said brake caliper during braking operations. By contrast, for a pad change, said hold-down clip can be released from the brake caliper 1.

The hold-down clip 250 is designed and dimensioned so as to hold down only one of the two brake pads 100, 200. Here, this is the reaction-side brake pad 220, which it holds down, but not the application-side brake pad 100, which it does not radially secure or hold down.

The hold-down clip 20 is preferably a generally flat component perpendicular to its axial direction. This is advantageous but not imperative. This however yields a space-saving design. The cross section of the hold-down clip 250 may preferably be rectangular, with two parallel narrow sides and two parallel long sides.

In this way, said hold-down clip 250 interacts with the brake pad 220. The brake pad 220 is designed to be held down by said hold-down clip 250 directly or via one or more interposed elements. Said brake pad extends from the brake caliper rear section 1b, parallel to the brake disk axis, into the caliper opening 1d, into which it projects but which it does not fully bridge. That end 252 of said brake pad which is averted from the brake caliper 1 engages over the pad carrier 210 of the reaction-side brake pad 200. Said end 252 however preferably does not also engage over the brake disk 2, and furthermore preferably does not also engage over the application-side brake pad 100 (see FIGS. 1 and 9).

Furthermore, it is also the case that the caliper opening 1d is not fully engaged over in the axial direction (parallel to the brake disk). Therefore, said hold-down clip 250 is structurally simple and nevertheless very reliable. It only needs to be fastened to one edge of the opening 1d on the brake caliper 1, preferably to the caliper rear section 1b.

That end 252 of the hold-down clip 250 which is averted from the brake caliper 1 preferably engages over at least the pad carrier 210 of the reaction-side brake pad 200. It furthermore preferably also engages over the cover 240 axially proceeding from the brake caliper 1, which cover is extended through by the pad spring 230 or by a part of the pad spring 230.

In one variant, it is advantageous if the hold-down clip 250 merely axially engages over the reaction-side brake pad 200 and thus radially secures the latter, but is not fastened to the brake caliper 200. Thus, good radial securing of the reaction-side brake pad 200 is realized.

By contrast, in a further variant, it is advantageous if the hold-down clip 250 is also fastened to the reaction-side brake pad 200. In this way, an easily handlable mounting unit is formed, which facilitates the pad change.

In one refinement of this variant, it is advantageous if the hold-down clip 250 is non-releasably fastened to the reaction-side brake pad 200.

In this way, firstly, an easily handlable mounting unit is formed, and secondly, it is ensured that, during a pad change, the hold-down clip 250 (which has been heavily loaded as a result of numerous braking operations) is also reliably jointly exchanged.

For the release, only the fixing of the hold-down clip 250 to the brake caliper 1 is released. Then, the reaction-side brake pad 200 together with the hold-down clip 250 is exchanged as a structural unit. Preferably, said structural unit advantageously also includes the pad spring 230. Said structural unit furthermore preferably also advantageously includes the cover 240.

The fastening of the hold-down clip 250 to the reaction-side brake pad 220 may be realized in a variety of ways, for example by way of a form-fitting or cohesive connection to a part of the reaction-side brake pad 220. In one variant—see FIG. 16—the pad carrier 210 is expedient as said part, or the pad spring 230 is expedient as said part (neither case is illustrated). Also, if present, the cover 240 is expedient as said part. This advantageous variant has been realized in the drawings of FIGS. 1 to 15.

The hold-down clip 250 may be cohesively connected to the cover 240, for example directly or indirectly (via an intermediate part such as a bolt) welded or brazed to said cover. The hold-down clip 250 may also be screwed to the cover 240 or fastened to the cover 240 by way of a rivet (not illustrated).

It is alternatively also advantageous for the cover 240 to have an integrally formed part such as an arm or multiple arms or even a circumferentially closed ring 245 (FIG. 6), which is preferably formed in one piece with said cover and by way of which the hold-down clip 250 is non-detachably attached to the cover 240. The ring 245 is preferably extended through by the hold-down clip 250 (FIG. 4). Additionally, the hold-down clip 250 may be cohesively fixed, for example by welding, to the ring 245.

In a side view (see for example FIG. 4), the hold-down clip 250 may be of stepped form. This serves, inter alfa, for compensating a height offset in relation to the brake caliper 1. This Z shape may furthermore also be utilized for simple and uncomplicated fixing of the hold-down clip 250 to the brake caliper 1.

The one end of the hold-down clip 250, which is fastened to the brake caliper 1, may be fixed there in a variety of ways. It is advantageous for said end to be fixed in a form-fitting fashion to the brake caliper 1 by way of a pin 255 (FIG. 1A, FIG. 9). For this purpose, the pin 255 extends through openings 1e, which in this case are bores, in two spaced-apart lugs 1f on the brake caliper 1, and engages over the hold-down clip 250, the end 251 of which lies on the brake caliper 1 between the lugs 1f. A T-shaped design of the end 251 here ensures that the hold-down clip 250 cannot slip in an axial direction through the lugs 1f.

At the two ends of the pad-holding spring 230—see again FIG. 4—there are provided slots 231, 232 which are extended through by lugs or projections 213, 214 formed integrally on the pad carrier 210 at the top side of the pad carrier 210.

Figure 15:
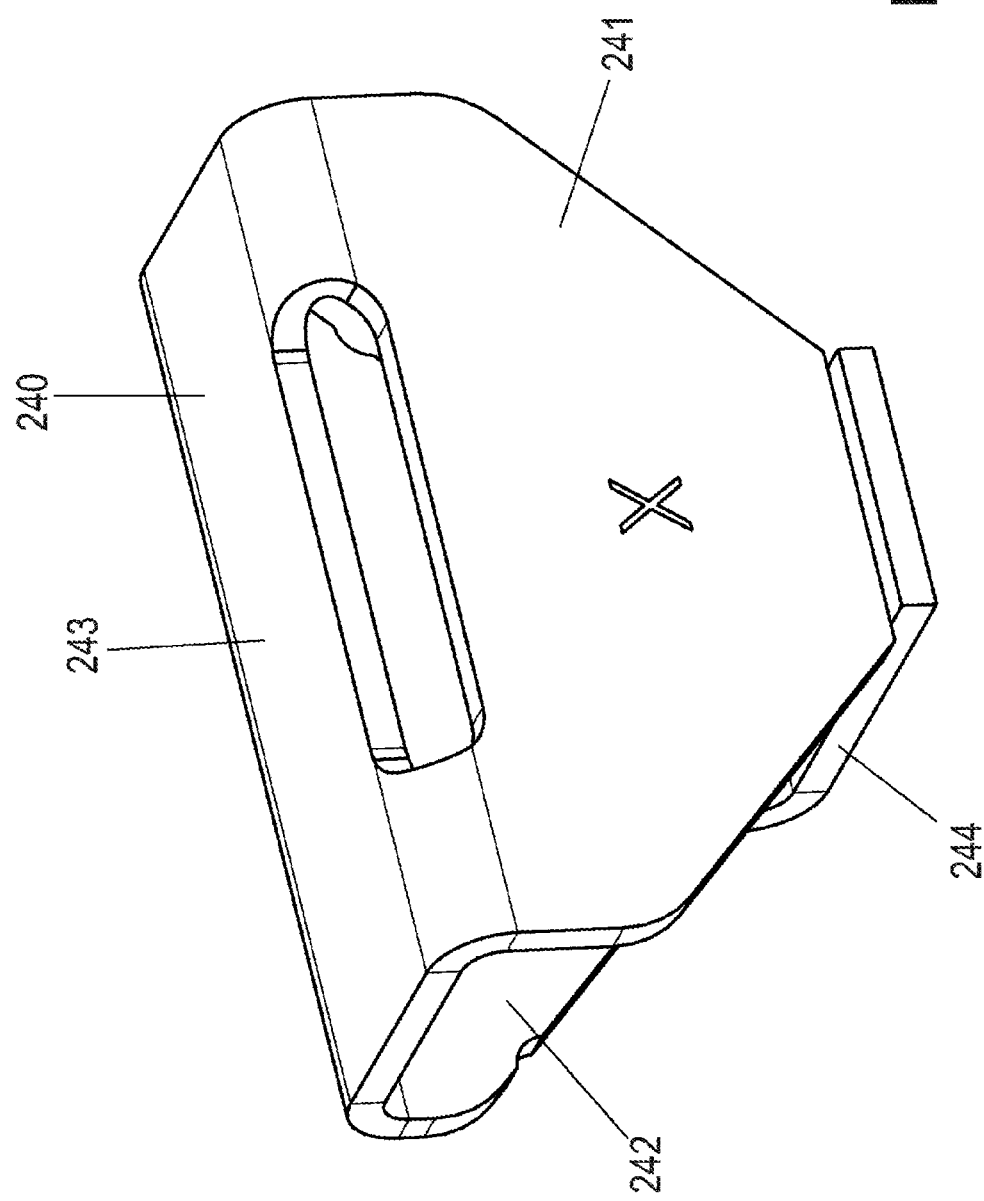
FIG. 15 is a cover of the brake pad from FIGS. 13 and 14.

For the preferably non-releasable connection of the pad-holding spring 230 to the pad carrier 210, the cover 240 is provided, which, as can be seen in particular in FIG. 4 and also FIG. 15, preferably has a cross section which is approximately rectangular in cross section, with two parallel limbs 241, 242 which are connected to one another by a web 243 above the pad carrier 210 and a further web 244 (which extends through an opening of the pad carrier 210).

Approximately centrally between the slots 231, 232, a longitudinal slot 233 is formed into the pad-holding spring 3, through which longitudinal slot is inserted one of the limbs 242 of the cover 240, which, like the opposite limb 241, lies or approximately lies against an associated wide side of the pad carrier 210.

Figure 5:
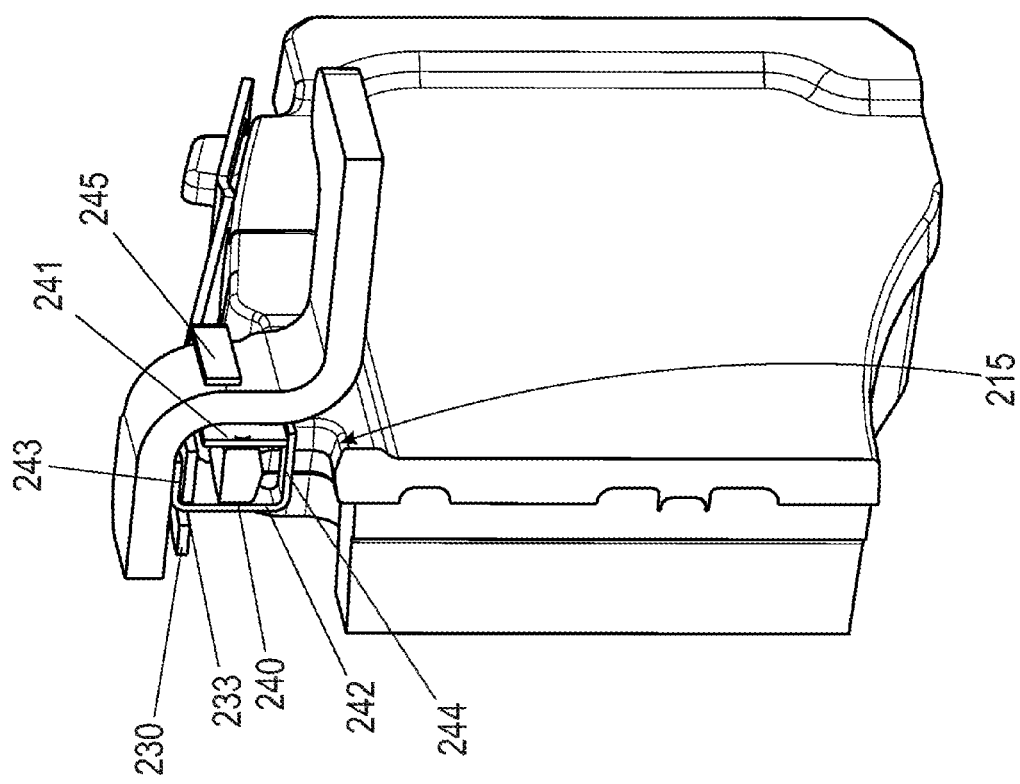
FIG. 5 is a partially sectional view of the arrangement from FIG. 4.
Figure 6:
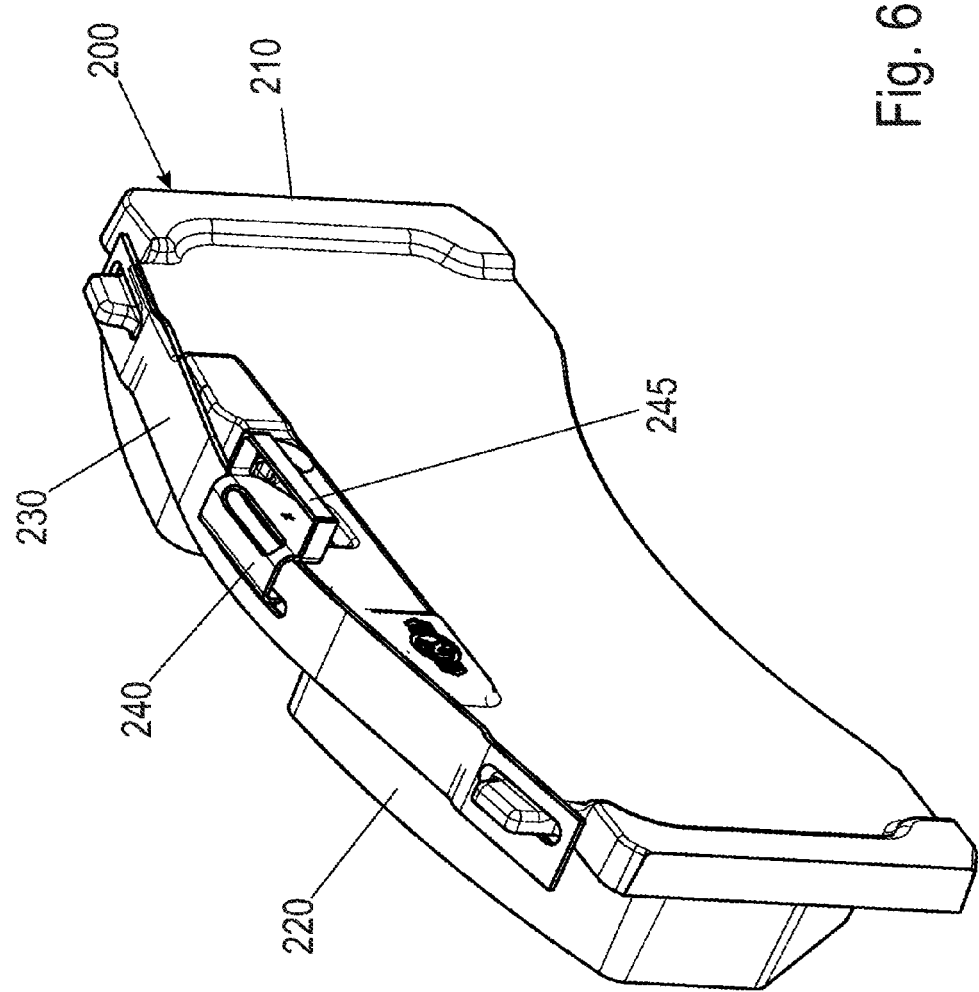
FIG. 6 is the brake pad of the arrangement from FIGS. 4 and 5.
Figure 7:
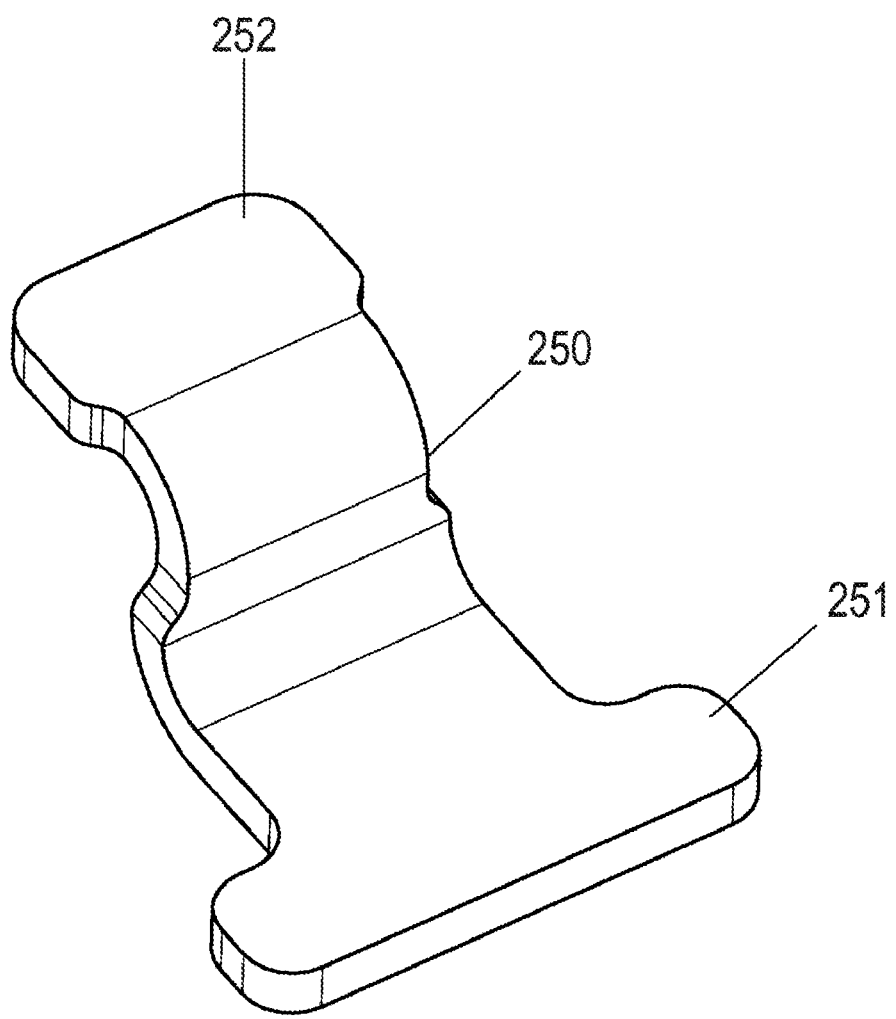
FIG. 7 is the hold-down clip of the arrangement from FIG. 4.
Figure 8:
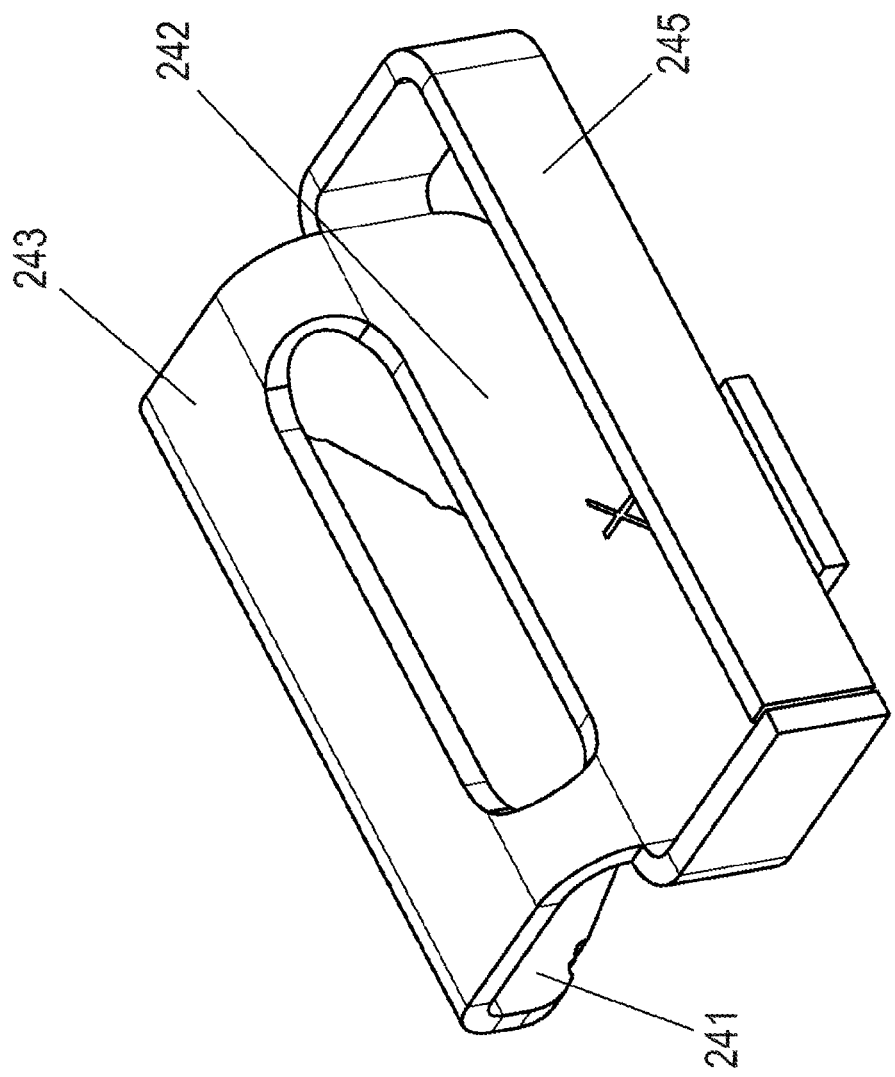
FIG. 8 is a cover of the arrangement from FIG. 4.

As can furthermore be clearly seen in FIG. 5, the pad-holding spring 230 is preferably wider or thicker than the axial thickness of the pad carrier 210, such that the pad-holding spring 230 protrudes in the direction of the friction pad 220, whereas its other longitudinal edge is approximately aligned with the rear side of the pad carrier 210. It can also be seen in FIG. 5 that the limbs 241 are adjoined, at the bottom, by the connecting web 244, which runs parallel to the web 243.

A non-destructive release of the cover 240 is ruled out by way of a preferably cohesive connection, whereby a secure fastening of the pad-holding spring 230 is ensured. For this purpose, the cover 240 may also be cohesively fastened to the pad-holding spring 230 or to the pad carrier 210.

The limbs 241, 242 are otherwise in terms of their outline in this case of preferably trapezoidal design, wherein the wide side is formed by the web 243, whereas the connecting web 244, which in this case extends through the passage hole 215 in the pad carrier 210 in a displaceable manner, defines the relatively narrow side. As already stated, in relation to the longitudinal extent of the pad-holding spring 230, the longitudinal slot 233 is preferably arranged approximately centrally. Said longitudinal slot is very particularly preferably arranged exactly centrally (see also, with regard to the background, the patents EP 1 963 702 B1 and EP 2 255 101 B1).

The cover 240 is preferably radially deflectable to a limited extent on the pad carrier 210. For this purpose, the cover 240 extends with the web 244 through the passage hole 215.

Since the reaction-side brake pad 220 does not change its position in the brake caliper 1 even with increasing wear, it is possible for the hold-down clip 250 to be formed directly as a structural unit with the reaction-side brake pad 200. The cover 240 is particularly expedient for this purpose, which cover thus takes on a further, hitherto unknown function —the fixing of the hold-down clip (for example in FIGS. 4, 11 and 5 and 12). In this way, a particularly advantageous reaction-side brake pad 200 is created which has, as a preferably integrated constituent part, a hold-down clip 250 which has a short structural form which is advantageously restricted to the function of holding down said one brake pad. Advantages to be mentioned are also the simple mounting, reduced production costs, relatively low loads and assurance of correct installation.

The embodiment of the hold-down clip 250 with said brake pad as a structural unit, which is exchanged as a whole during a pad change, is therefore advantageous. This is simple and leads to a renewal of all elements to be exchanged in the "reaction-side pad" structural unit (brake pad, pad spring, if present: cover and hold-down clip).

Whereas it is the case in FIGS. 2 to 8 that the hold-down clip 250 extends through the ring 245 of the cover 240, to which said hold-down clip is preferably also cohesively fixed, provision is made in FIGS. 9 to 15 to utilize a pin (collar bolt, head bolt or the like) 254 for the fastening of the hold-down clip 250 to the cover 240 and thus to the brake pad 200. The pin 250 extends through the hold-down clip in the region of a bore 253 (FIG. 14) radially, and is for example welded or fastened in some other way to the cover 240 (for example by riveting, pressing etc.). The ring 245 may be formed from lugs of the cover 240 and may be of circumferentially closed or non-circumferentially closed form.

Figure 16:
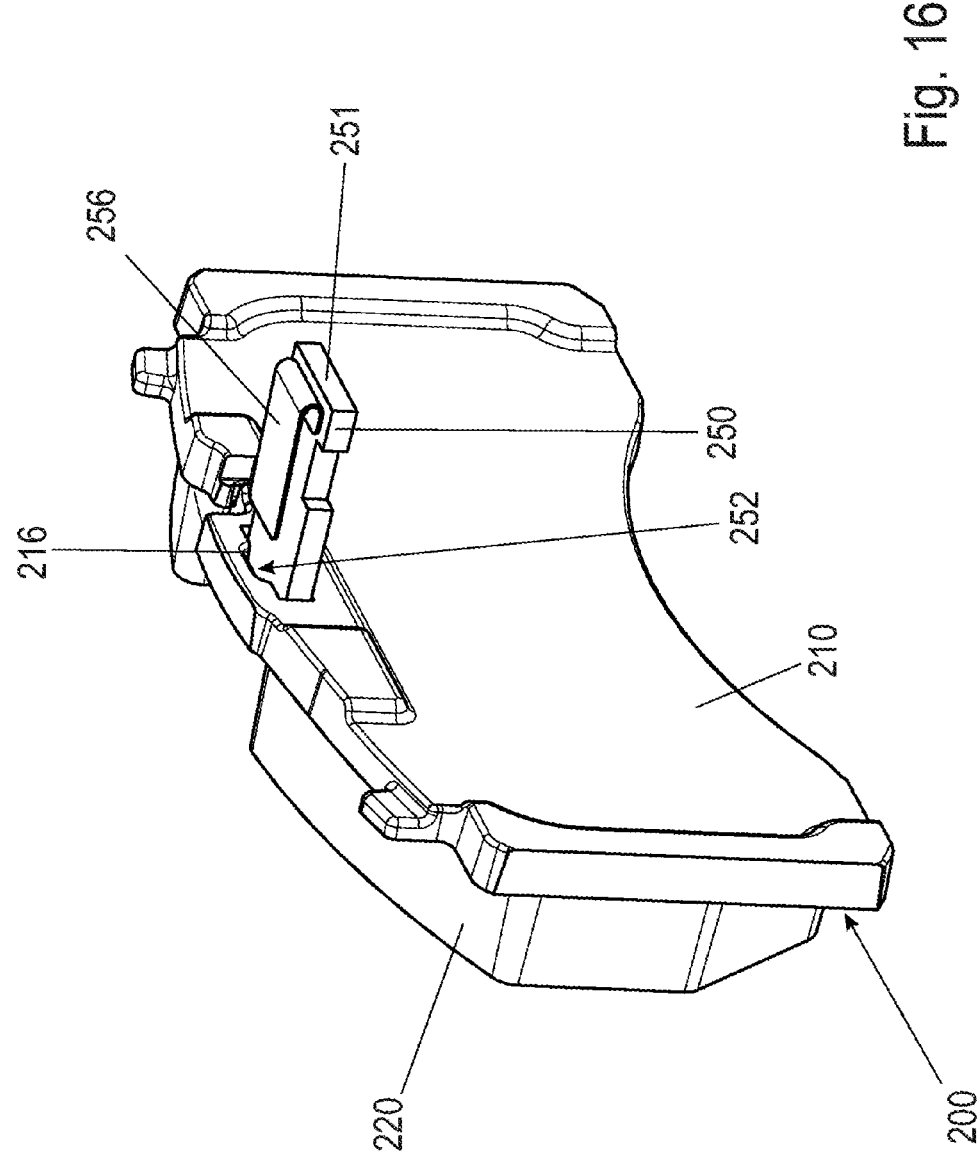
FIG. 16 is a further variant of a reaction-side brake pad with a hold-down clip arranged thereon.

The hold-down clip 250 may also be arranged directly on the pad spring 230 or on the pad carrier 210 (the latter variant is illustrated for example in FIG. 16).

In FIG. 16, the pad carrier 210 has an opening 216 into which that end 252 of the hold-down clip 250 which points toward the pad carrier 210 (this also means "a section situated relatively close to the pad carrier 210") engages.

Figure 17:
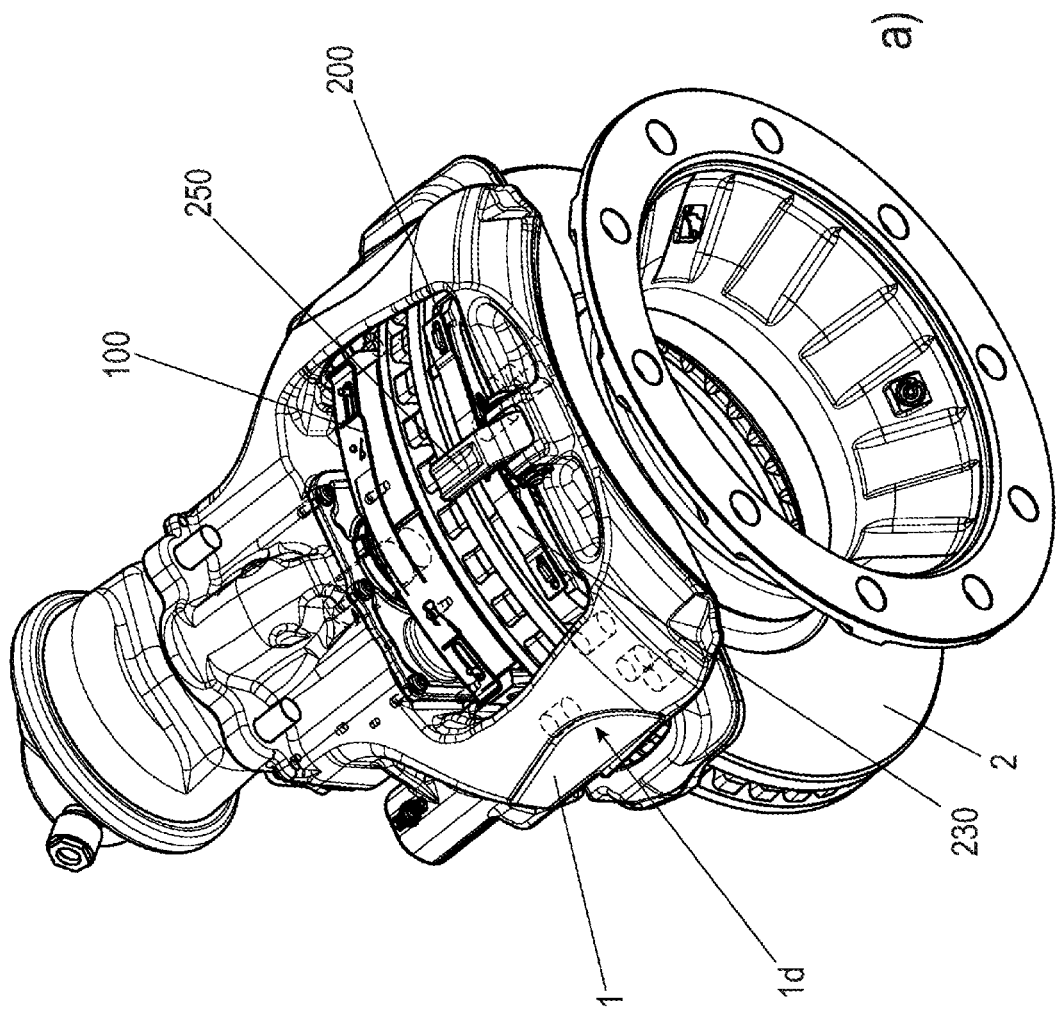
FIG. 17A is a perspective view of a part of a third further disk brake according to an embodiment of the invention.
FIG. 17B is a section through a partial region of the arrangement from FIG. 17A.
FIG. 17C a partially sectional view of a partial region of the arrangement from FIG. 17A.
FIG. 17D is a hold-down clip of the arrangement from FIG. 17A in a separate perspective illustration.
Figure 17:
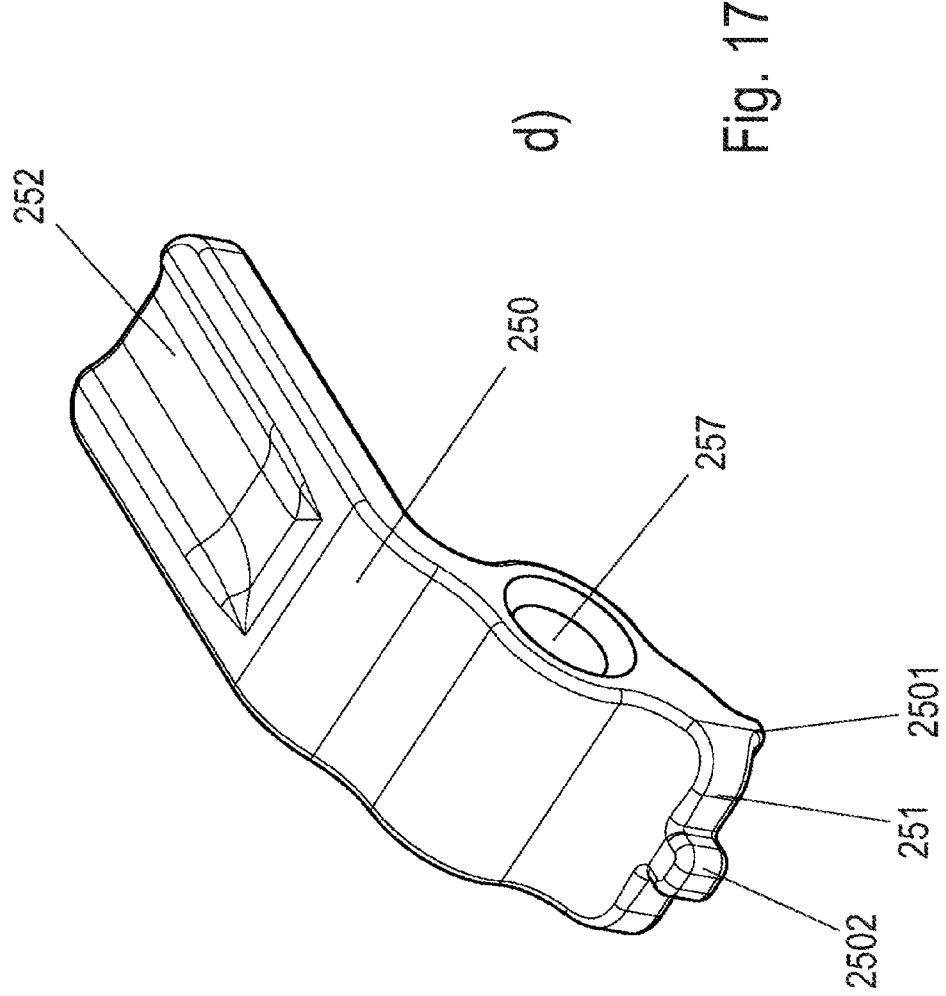

The opening 216 may be configured in the manner of a blind hole, or as a passage opening. The other end 251 of the hold-down clip 250 (or a region situated relatively close to the brake caliper 1) may be fixed in form-fitting and/or cohesive fashion (preferably non-releasably) at/in the opening 1d. That end 251 of the hold-down clip 250 which is situated relatively close to the brake caliper 1 points towards the brake caliper 1 and is fixed there in form-fitting and/or cohesive fashion (preferably releasably) in a manner not illustrated here, for example similarly to FIG. 1A or 17. Additionally, a spring 256 may be provided on the hold-down clip 250, which spring can be utilized for resilient support of said brake pad 210 relative to a counterbearing such as the brake caliper 1 (not illustrated here).

The hold-down clip 250 may thus fully or partially extend through the pad back plate or the pad carrier 210. Subsequently, the spring 256 is fastened to the hold-down clip. In this way, the hold-down clip —as already mentioned —is, together with spring 256, captively connected to the reaction-side brake pad 200. The pad-holding spring is thus displaced away, or axially spaced apart, from the brake pad 200. This offers the advantages described in this regard in the introduction.

According to FIGS. 17A, 17B, 17C and 17D, the hold-down clip 250 has a passage opening 257 (for example a bore), preferably parallel to the brake disk 2, in order to hold the one end 251 of the hold-down clip 250 which is fastened to the brake caliper 1 there by way of a bolt or pin 255, which in this case runs parallel to the plane of the brake disk 2. For this purpose, the bolt or pin 255 extends through the passage opening 257 and the lugs if on the brake caliper 1. The bolt or pin 255 has, at one end, a head 255a outside the two lugs 1f, and is secured by means of a securing element 260 (in this case a disk and splint) at its other end. A form-fit means such as a projection 258 at the bottom on the pad-holding clip at the other end 252 of the hold-down clip on the pad carrier 210 or on the pad spring 230 interacts in a form-fitting fashion with a corresponding form-fit means on the pad carrier 210, such that the brake pad is fixed axially and radially. That end 251 of the hold-down clip 250 which is fastened to the brake caliper 1 furthermore engages axially into a recess 1g of the brake caliper 1, which additionally secures the hold-down clip 250 on the brake caliper.

A contour 2502 (a type of projection) on the end 251 of the hold-down clip 250 on the brake caliper 1 limits the rotation of the hold-down clip 250, which in this case is preferably not connected to the brake pad 200, and ensures that a predefined envelope contour of the brake is maintained. In the stated variants, this is likewise realized by way of the end 251 of the hold-down clip 250 on the brake caliper 1. A further contour 2501 (a projection downward) on the hold-down clip, which further contour is inserted into the recess 1g, facilitates the mounting of the hold-down clip 250, which must be pushed against a pad spring 230 in order to insert the bolt 255.

According to FIG. 18, the hold-down clip 250 is detachably fastened on the brake caliper 1 in a simple manner by way of one or more screws 259, which are screwed into the brake caliper 1, for example in this case in a radial direction.

Figure 19:
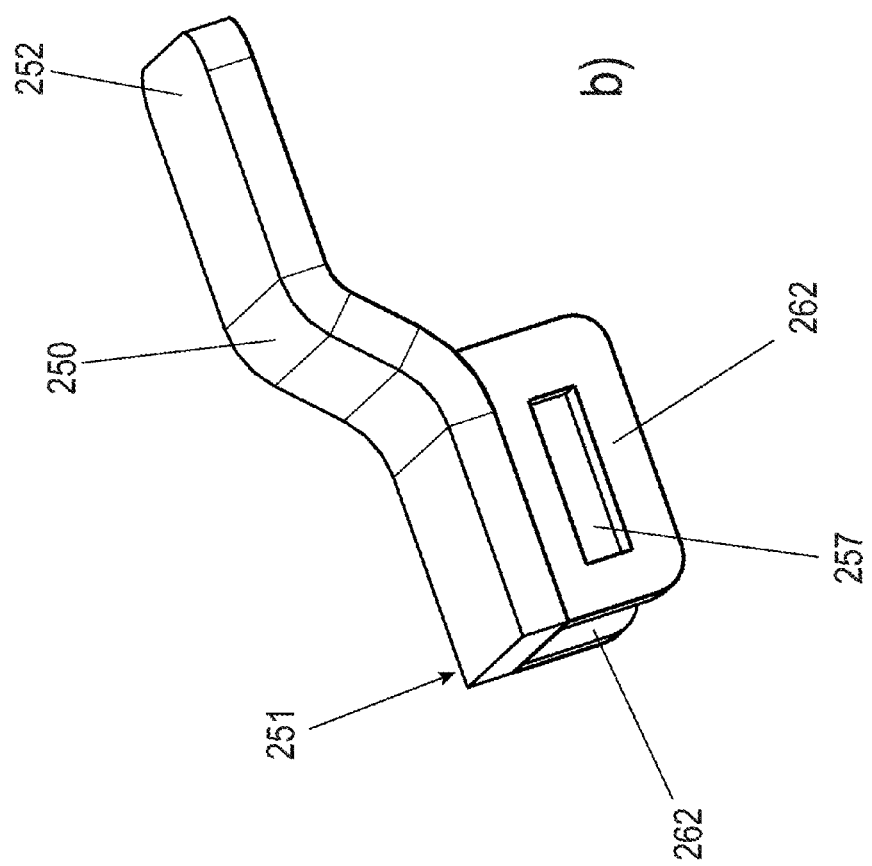
FIG. 19A is a perspective view of a part of a fifth further disk brake according to an embodiment of the invention.
FIG. 19B is a hold-down clip for the arrangement from FIG. 19A in a separate perspective illustration in each case.
Figure 20:
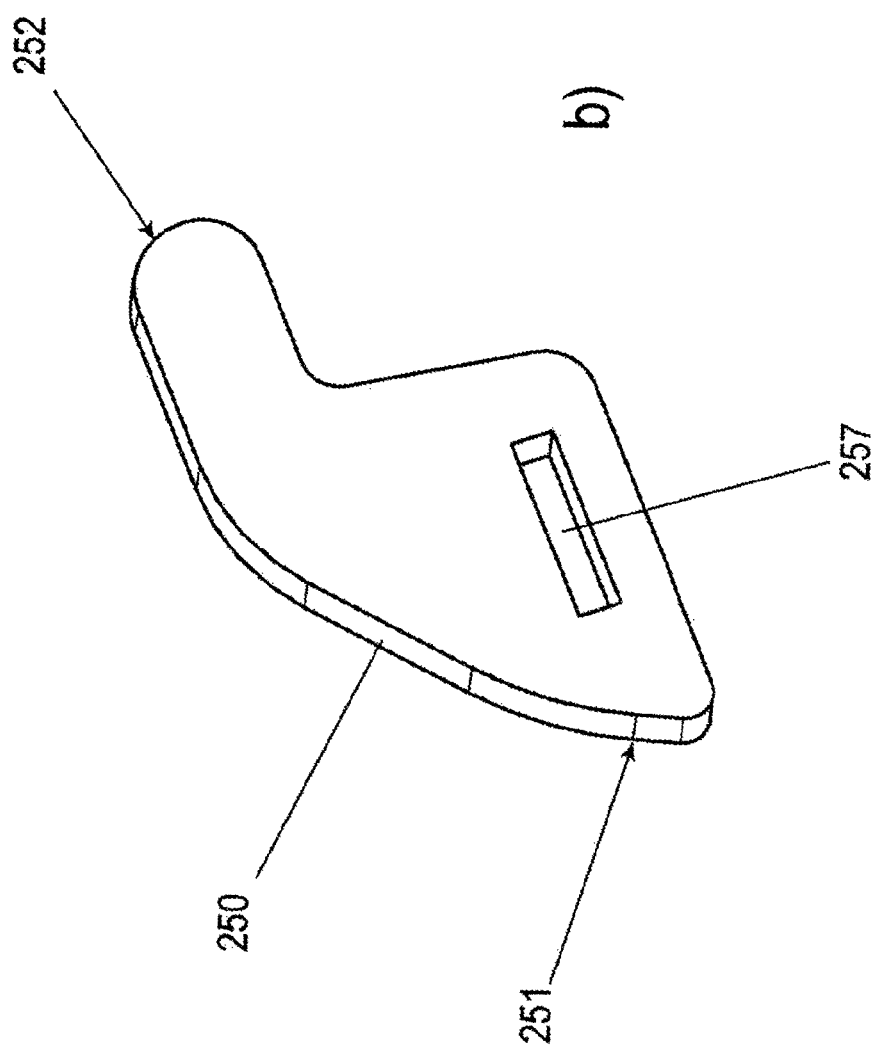
FIG. 20A is a perspective view of a part of a further disk brake according to the invention.
FIG. 20B is a hold-down clip for the arrangement from FIG. 19 or 20A in a separate perspective illustration in each case.

The passage opening 257 or the passage openings 257 for the bolt or pin 255 for fastening or holding the hold-down clip 250 may have a circular cross section or some other cross section, for example a polygonal cross section (illustrated in FIG. 19A, FIG. 19B; FIG. 20A, FIG. 20B). The pin may, in a manner adapted to this, have the shape of a circular pin or of a flat web (not illustrated here, which may also at one end be of curved form or have an angled portion or an enlarged head, such that it bears at one side against the passage opening and cannot slip through the latter). On the other side of the passage opening, said pin may be secured by way of a splint or a nut on a thread section or by some other suitable means. The pin 255 in the form of the flat web is inserted through one or more passage openings 257 of the hold-down clip 250 and one or more corresponding passage openings of the lug or lugs if on the brake caliper 1, and fixed. A rotation prevention means for the hold-down clip 250 is thus also realized.

The hold-down clip 250 may be produced in a variety of ways. It may be formed as a punched/bent part (see for example FIG. 19A (as a flat web which lies flat on the brake pad 200 and which has two lugs 261) or FIG. 20A (as a flat web which lies perpendicularly on the brake pad 200)), or for example as a cast part or as a part produced in some other way.

The exemplary embodiments of FIGS. 21A-21B and 22A-22C will be considered in more detail below.

For detection of wear of the brake pads or of the friction pads 220 thereof that arises as a result of braking operations, in each case one wear sensor (not illustrated here) is integrated into each of these. In each case one signal cable (not illustrated here) is connected to the wear sensors. Said signal cable has at least one conductor, preferably at least one electrical conductor. The at least one conductor may be surrounded by an insulator and/or by a cable sheath.

At least one of the signal cables is laid so as to fully cross the opening 1d of the brake caliper 1 and (in a manner that can be seen here) is led to a brake pad wear determining and possibly display device of the disk brake. For this purpose, the signal cable is arranged and held on a cable bridge 271. The cable bridge 271 fully bridges or crosses the opening 1d of the brake caliper 1. It preferably fully bridges the opening 1d in an axial direction parallel or substantially parallel to the brake disk axis of rotation or axis.

The cable bridge 271 may be composed of metal. It may furthermore advantageously be easily formed as a punched/bent part composed of a metal sheet. It may however also be composed of another material.

The cable bridge 271 preferably has a central web section 272. Said web section 272 is in this case of straight design. Here, in the installed state, said web section extends parallel to or substantially parallel to the brake disk axis of rotation D.

The web section 272 preferably has first and second fastening means 273 and 274 at its two mutually averted ends. Said first and second fastening means 273 and 274 of the cable holder or of the cable bridge 271 serve for the fastening of the cable holder 271 to corresponding first and second counterpart fastening means 275, 276 of the brake caliper 1—FIG. 21—or of an element fastened to the brake caliper 1—FIG. 22.

The first and second fastening means 273 and 274 of the cable holder or of the cable bridge 271 and the corresponding first and second counterpart fastening means 275, 276 of the brake caliper 1 may, on one side of the opening 1d, be formed a substantially tolerance-free first fastening and, on the other side of the opening 1d of the brake caliper 1, a second fastening with tolerance-compensating action.

For this purpose, in a variant which is easy to realize in terms of structural design, the first and second fastening means 273, 274 may be formed as a circular hole 273 and as an elongated hole 274 at or in the opposite ends of the cable holder 271. The corresponding counterpart fastening means 275, 276 may then for example be formed, in an advantageous and simple manner, as screws 275, 276 or pins or the like of the brake caliper 1 which are fixed to the brake caliper 1, for example fixedly screwed into bores of the brake caliper 1.

Figure 21:
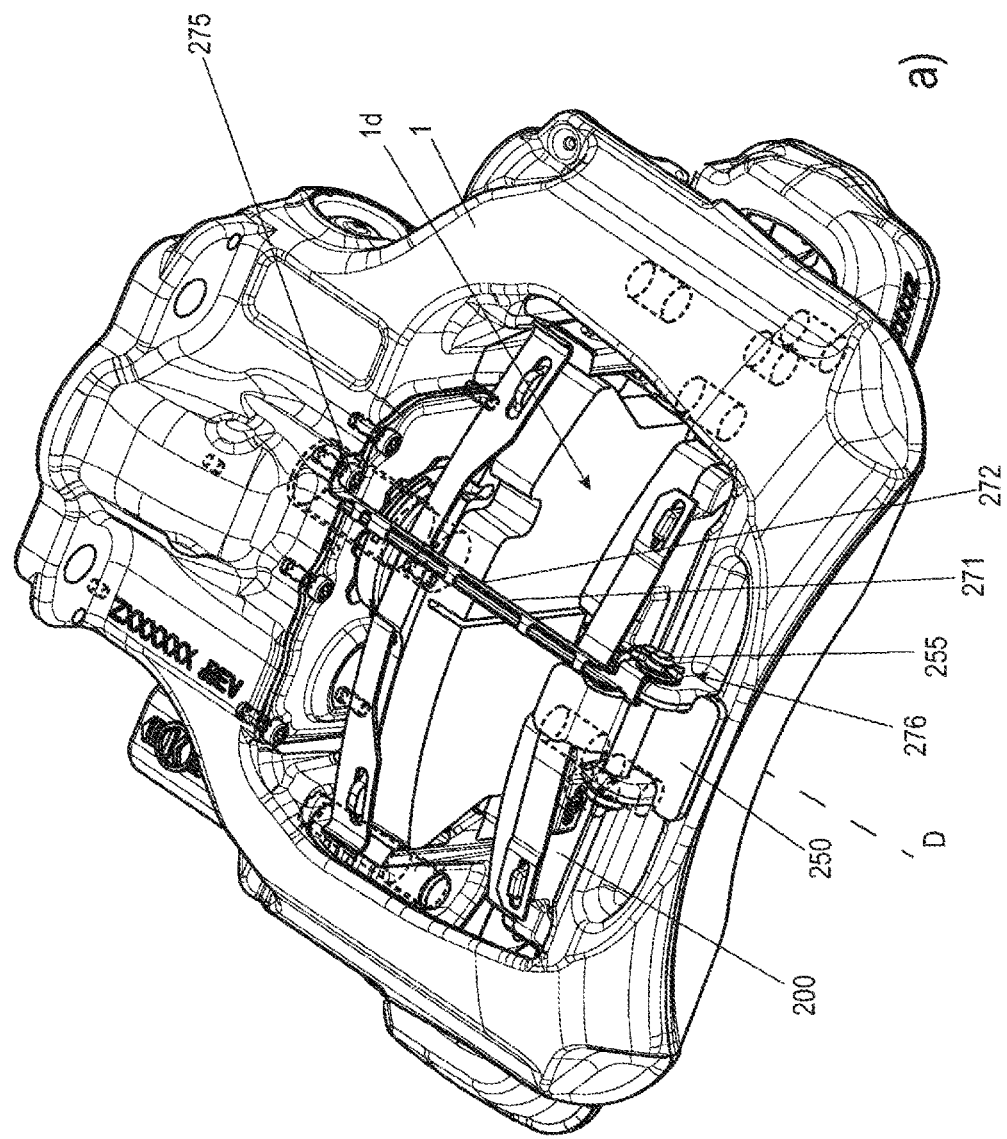
FIG. 21A is a perspective view of a part of a sixth further disk brake according to an embodiment of the invention with a cable bridge.
FIG. 21B is the cable bridge of the disk brake from FIG. 21A.
Figure 21:
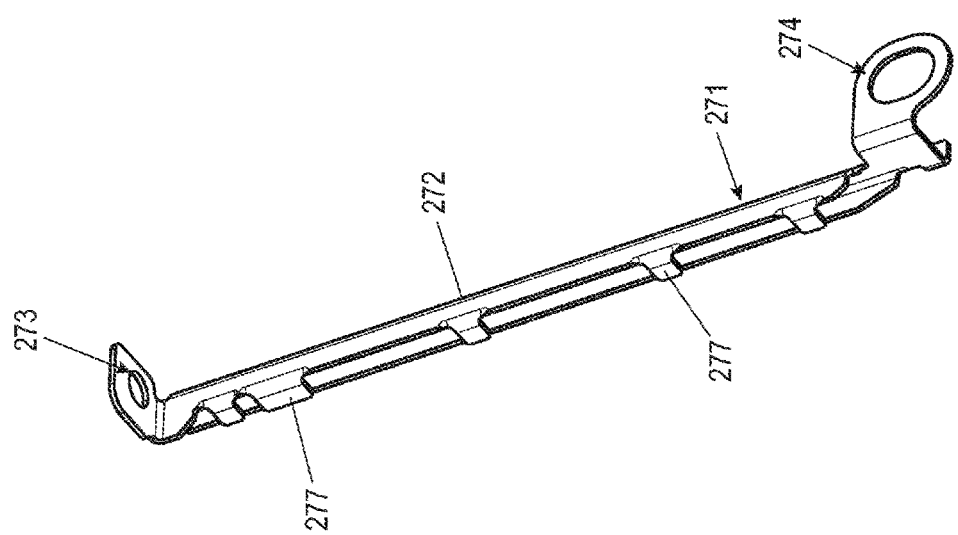

If the one end of the hold-down clip 250 which is fastened to the brake caliper 1 is fixed in form-fitting fashion to the brake caliper 1 by way of a pin 255 (FIG. 1A, FIG. 9; FIG. 21), said pin 255 fixed to the brake caliper 1 can extend through the bore 276—preferably the elongated hole for tolerance compensation purposes. The elongated hole 276 can then be displaced on the pin. The end of the hold-down clip 250 with the bore 276 is then arranged in the manner of a washer between a head of the pin 255 and an abutment surface of the brake caliper 1. This fastening variant is structurally simple and inexpensive, because a single fastening means—the pin 255—is utilized twofold.

The cross section of the web section 272 of the cable holder 271 is, in a preferred embodiment, preferably U-shaped. Here, the closed side of the U preferably faces toward the brake pads 100, 200 in order to thus realize shielding against heat that is radiated by the brake disk and the brake pads. The signal cable can then be placed into and fastened in the U-shaped web section 272. For this purpose, lugs 277 may be formed on the web section 272, which lugs are, after the placement of the signal cable 271 into the web section 272, bent such that the signal cable is, in sections, held entirely or in substantially circumferentially closed fashion on the web section 272.

The web section 272 may freely engage over the opening 1d. This means that the web section 272 is fastened only at the two ends —for example in the manner described above—to the brake caliper 1, and preferably not to other elements of the disk brake.

The web section 272 may however also optionally or alternatively (at one of its ends or more centrally in the web region 271) be fixed to the hold-down clip 250 which does not fully cross the opening 1d, and which holds down only one of the two brake pads 100, 200.

For this purpose, it is advantageous if a further lug 278 of the web section 272 is fixed to the pad-holding clip 250 (see FIGS. 22A-22C). This fixing may be realized in a variety of ways. Accordingly, in one preferred variant, it may be realized by virtue of the lug 278 being laid around a web 262 on the hold-down clip 250 and encompassing said web. Here, it is furthermore advantageous if the web 272 projects in the manner of a type of finger element axially from the end of the hold-down clip 250 at which finger element said hold-down clip radially holds down the brake pad assigned thereto. In this way, it is possible in a simple manner for the hold-down clip 250 and the web section 271 to move relative to one another, in particular pivot relative to one another, to a limited extent. Such relative movements may arise during braking operations. The lug 278 may thus on its own form the counterpart fastening means 276. The hold-down clip 250 is a part fastened to the brake caliper 1, such that the cable bridge 271 is thus in turn fastened—indirectly—to the brake caliper 1.

The web section 272 may however also be fastened in some other way, for example by way of at least one screw or a rivet, to the pad-holding clip 250.

Figure 22:
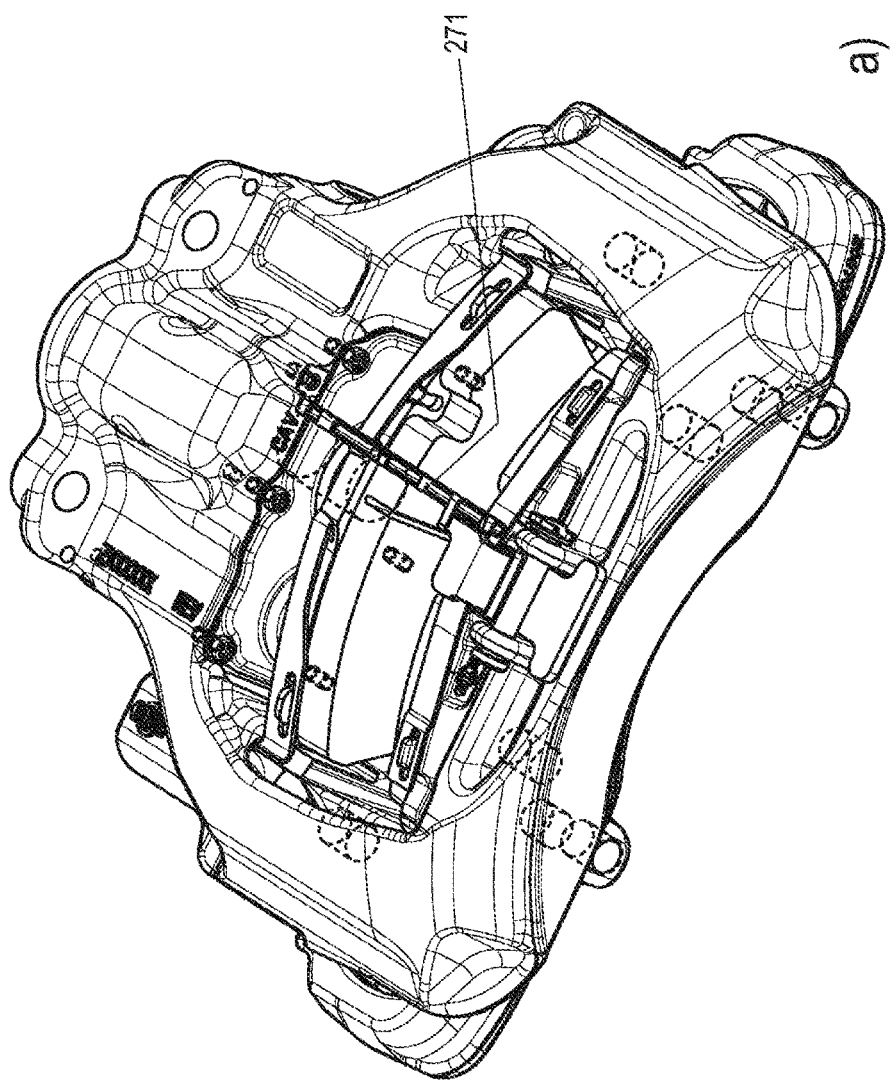
FIG. 22A is a perspective view of a part of a seventh further disk brake according to an embodiment of the invention with a cable bridge designed differently to that in FIG. 21B, an enlarged detail from FIG. 22A.
FIG. 22C is the cable bridge of the disk brake from FIG. 22A.
FIG. 22D is a pad-holding clip of the disk brake from FIG. 22A.
Figure 22:
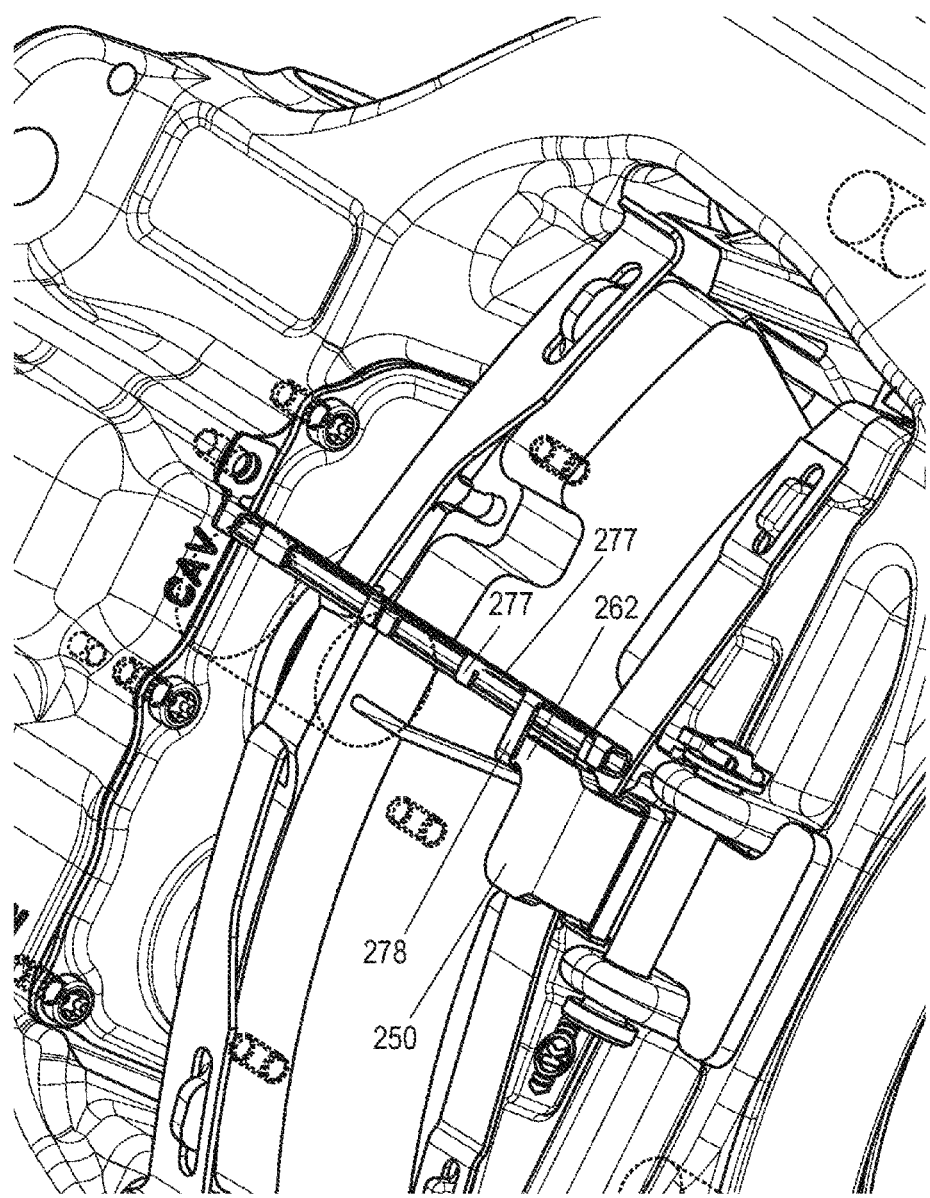
Figure 22:
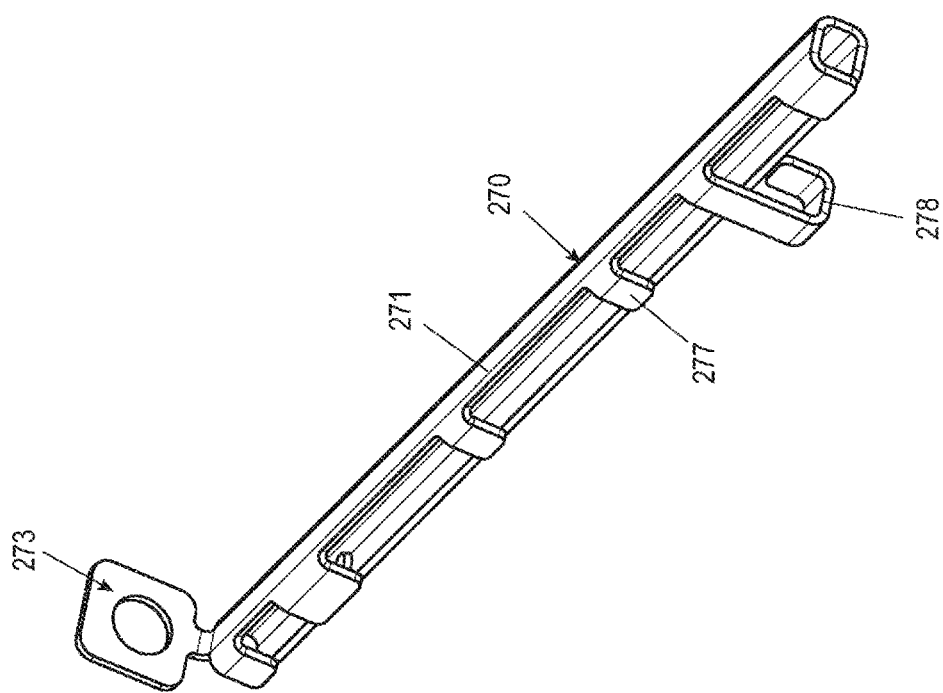
Figure 22:
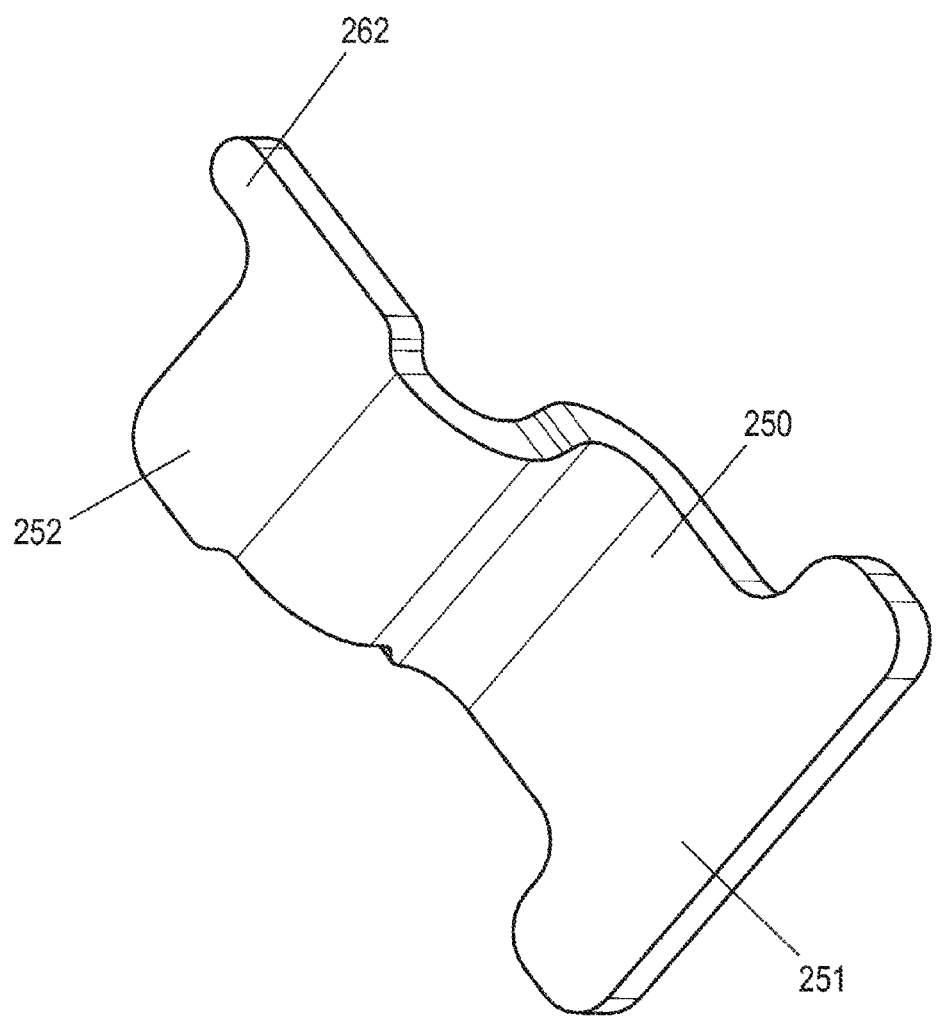

It is thus advantageous —abstracting the variant of FIG. 22—if the cable bridge 271 is fastened in force-fitting and/or form-fitting fashion to the hold-down clip 250, in particular to the web 262 of the hold-down clip 250. A force fit may be realized (not illustrated) for example by virtue of the cable bridge 272 being laterally attached with clamping action to the hold-down clip 250. Here, in particular, a lateral—tangential—attachment in the circumferential direction to the hold-down clip 250 at a narrow side of the hold-down clip 250 is possible.

In this way, a type of cable bridge 272 is formed which preferably performs the function of cable guidance and of thermal and mechanical shielding. Here, the cable bridge 272 is, as described, fixedly attached (screw connection) at one side, on the application side, to the brake caliper 1. On the reaction side, a type of floating bearing arrangement with tolerance-compensating action is realized such that the cable bridge is fixed by way of an elongated hole to the pad-holding clip bolt or pin 255. The cable bridge 272 can thus compensate the caliper deformation in an effective manner.

The fastening may however also be realized by virtue of the pad-holding bolt or pin being configured as a fixed bearing, and the fastening to the caliper on the other side of the opening 1d being configured as a floating bearing.

The cable guide on the cable bridge 272 is designed to be as far remote from the brake disk as possible in order to keep the temperature loading as low as possible. Secondly, the cable guide is positioned so as to be situated in the shadow of the axial tension struts of the brake caliper 1 so as to be protected in an effective manner against foreign bodies (for example ice, dirt, stones) entrained by the wheel rim. This makes it possible for the sheet-metal thickness at the cable guide to be reduced to a minimum.

In the following figure description of FIG. 23 et seq., expressions such as top, bottom, left, right, front, rear etc. relate to the exemplary illustration and position of the brake carrier, of the brake pad, of the carrier horn, of the bridge, of the guide contour and the like selected in the respective figures. These expressions are not to be understood as being limiting, that is to say different working positions or the like may change these references.

Figure 23:
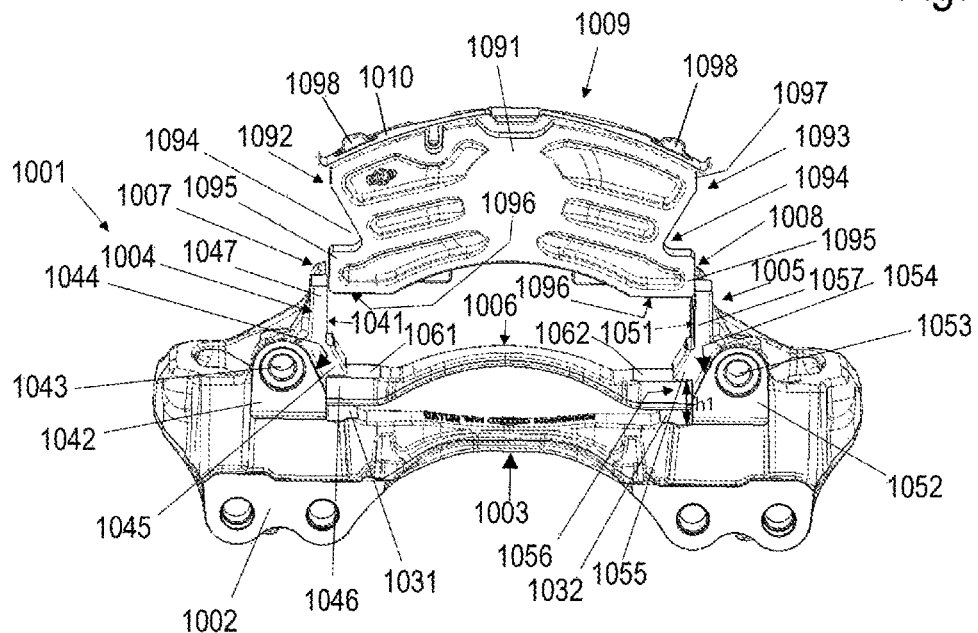
FIG. 23 is a perspective illustration of a design variant of a brake carrier and of a brake pad before the mounting process.

In FIG. 23, the reference designation 1001 denotes a brake carrier for a disk brake, which can be actuated pneumatically or by electric motor, of a vehicle, in particular of a utility vehicle, in particular in the manner of one or more of FIGS. 1 to 22.

The brake carrier 1001 has an attachment region 1002 which serves for fixing to a vehicle axle, for example by screw connection to an axle flange of a vehicle axle of the utility vehicle (not illustrated here).

Integrally formed above the attachment region 1001 is a pad slot which serves for receiving and supporting at least one brake pad 100.

The brake carrier 1001 shown here has in this case two such pad slots. The brake carrier 1001 is in this case designed so as to engage over a brake disk of the disk brake, and thus in each case one pad slot for receiving a brake pad 1009 is integrally formed on both sides of the brake disk.

Each of the pad slots is in this case formed, in relation to a preferred "vehicle forward" direction of travel, by an entry-side carrier horn 1004, 1007, an exit-side carrier horn 1005, 1008 and a bridge 1003, 1006 which connects the entry-side carrier horn 1004, 1007 to the exit-side carrier horn 1005, 1008.

Here, the carrier horns 1004, 1005 and the bridge 1003 denote the application side. Correspondingly, an entry-side carrier horn 1001, an exit-side carrier horn 1008 and a bridge 1006 are integrally formed on the reaction side of the brake carrier 1001.

The formation of the pad slot on the application side will be described in more detail in the further description.

The pad slot of the reaction side may in this case be designed in the same way. It is however also conceivable for the reaction-side pad slot to be designed at least slightly differently to the application-side pad slot.

Those regions of the bridge 1003 which adjoin the carrier horns 1004, 1005 form bearing surfaces 1031, 1032 which serve for radially supporting the brake pad 9, wherein a bottom side 1096 of the brake pad lies, in the inserted state, on the bearing surfaces 1031, 1032. The bridge 1006 of the reaction side of the brake carrier 1001 also has such bearing surfaces 1061, 1062.

On the top side, situated opposite the bottom side 1096, of the brake pad 1009, there is preferably held a pad-holding spring 1010. The pad-holding spring 1010 is in this case preferably fixed to the outer edges of the top side of a pad carrier plate 1091 of the brake pad 1009 at holding lugs 1098.

The carrier horns 1004, 1005 each have an inner side 1041, 1051 facing toward the pad slot, against which inner side, in the mounted state of the brake pad, at least sections of side surfaces 1092, 1093 of the pad carrier plate 1091 of the brake pad 1009, such as the abutment surfaces 1097 shown in FIG. 23, are supported.

At a side surface 1042, 1052, averted from the brake disk, of the carrier horns 1004, 1005, there are arranged respective guide contours 1044, 1054, which serve for guiding the brake pad 1009 into a sliding-in position to the side of the pad slot. Here, the sliding-in position refers to the position in which the brake pad 1009 can be slid, axially with respect to the vehicle axle (not shown) or with respect to the axis of rotation of the brake disk, into the pad slot between the carrier horns 1004, 1005.

Said guide contours 1044, 1054 are, as shown in FIGS. 24 to 27, integrally formed/formed preferably as material thickening of the carrier horns 1004, 1005 on the side surfaces 1042, 1052 of the carrier horns 1004, 1005.

It is thus made possible for a pad carrier plate 1091 which is guided in a radial direction along a side surface 1047, 1057 of a beam piece of the carrier horn 1004, 1005 in the direction z of the axis of rotation of the brake disk, which pad carrier plate is moved not exactly but in a laterally offset manner during the radial insertion, to abut during the radial movement in the direction z with a bottom edge against the guide contour 1044, 1054, and to be guided along the latter into its centered position until, as illustrated in FIG. 3, the brake pad 1009 sets down on a mounting region 1033.

The mounting region 1033 defines an additional bearing surface of the respective bearing surfaces 1031, 1032 of those regions of the bridge 1003 which adjoin the carrier horns 1004, 1005, which additional bearing surface is designed to prevent a displacement of the brake pad 1009 too far past the pad slot in the direction of the axis of rotation of the brake disk.

Instead of the guide contours 1044, 1054 being integrally formed onto the side surfaces of the carrier horns 1004, 1005, it is in principle also contemplated for said guide contours 1044, 1054 to be fastened as separate, for example plate-like components to the respective carrier horn.

The application-side surfaces 1042, 1052 of the carrier horns 1004, 1005 furthermore have receiving bores 1043, 1053, which serve for the sliding mounting of a brake caliper which is not shown.

As is also shown in FIGS. 1-5, the guide contours 1044, 1054 of the carrier horns 1004, 1005 of a pad slot are shaped so as to converge on one another toward the bridge 1003.

Figure 24:
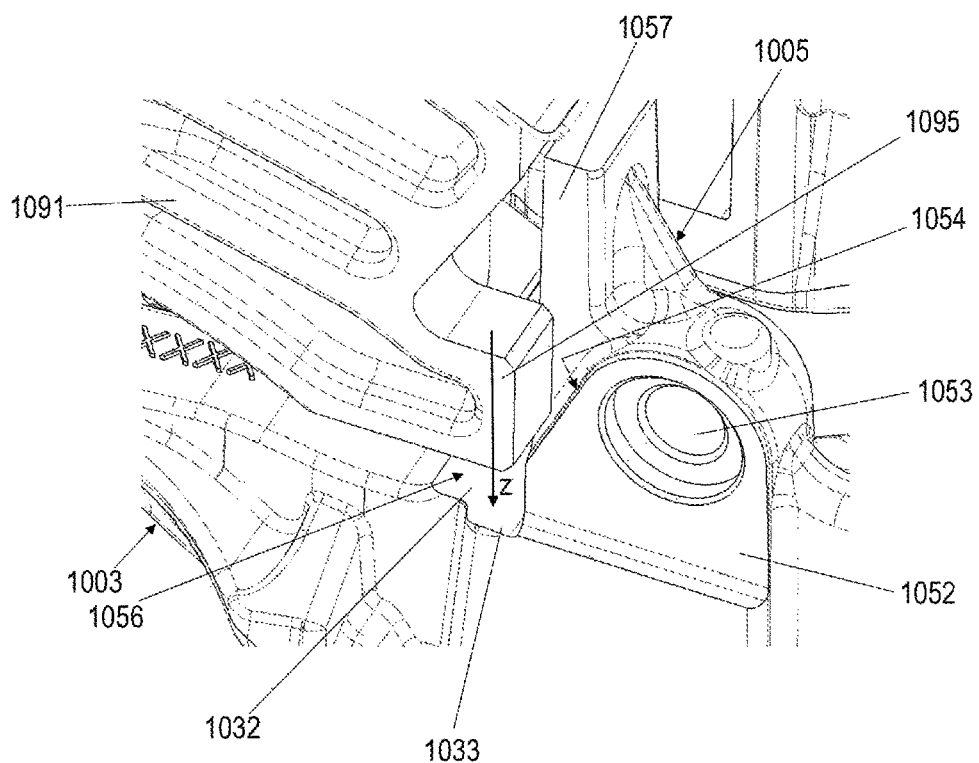
FIG. 24 is a perspective detail view of the brake carrier from FIG. 23 with partially radially inserted brake pad.
Figure 25:
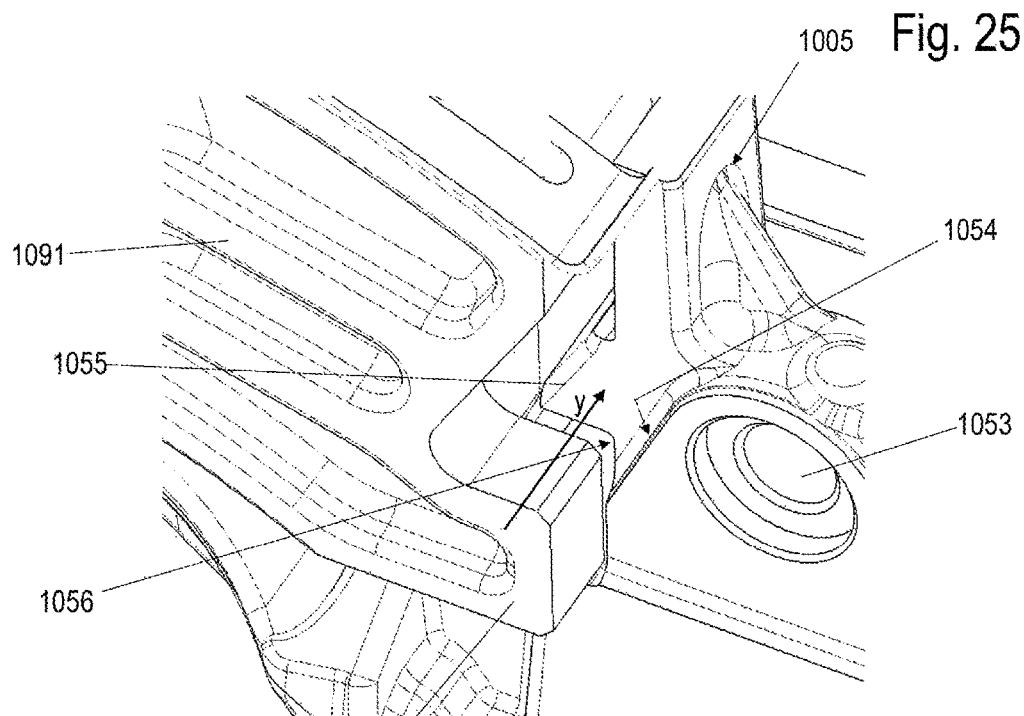
FIG. 25 is a perspective detail view of the brake pad and of the brake carrier from FIG. 1 with radially fully inserted brake pad before the axial displacement into the pad slot.
Figure 26:
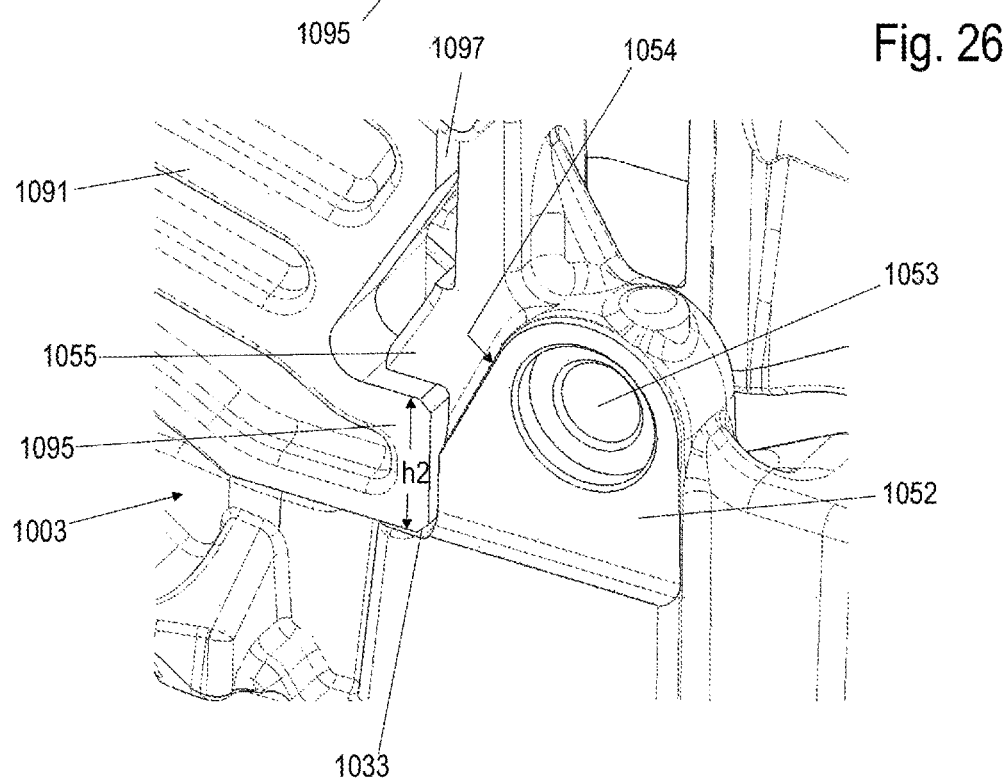
FIG. 26 is a view corresponding to FIG. 25 in the case of the brake pad having been inserted into the pad slot.
Figure 27:
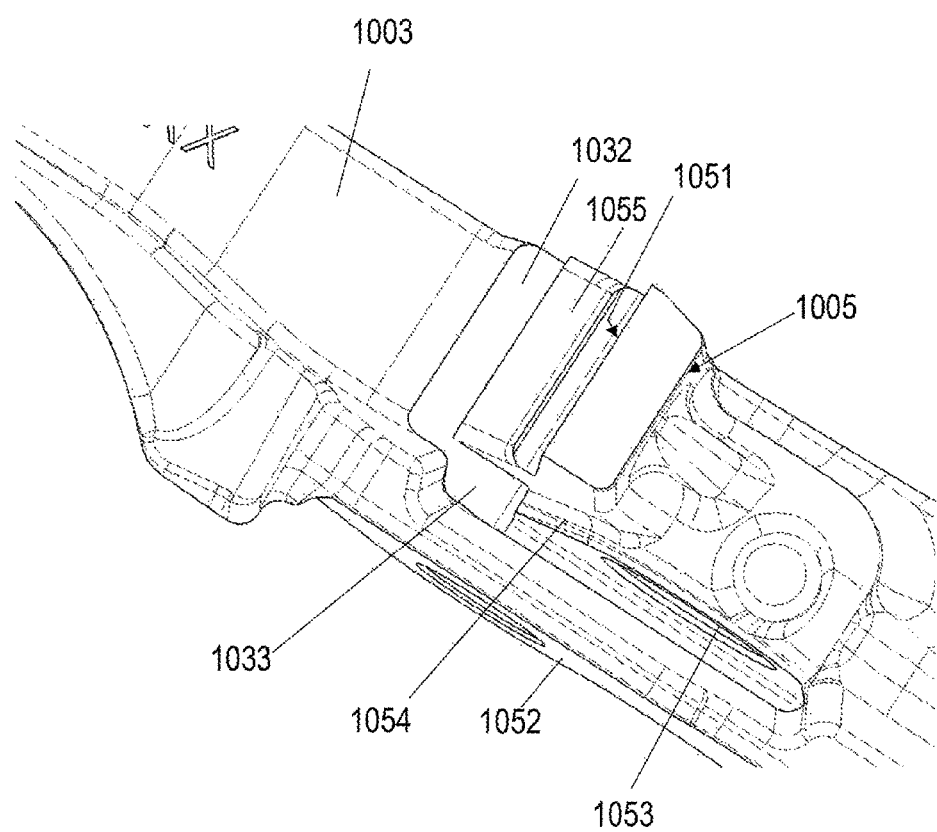
FIG. 27 is a plan view of the brake carrier from FIG. 23.

Thus, as can be seen particularly clearly in FIGS. 23-25, the guide contours 1044, 1054 have two rectilinear regions which are at right angles to one another.

A first rectilinear region is in this case oriented at an angle with respect to the sliding-in direction z and serves for guiding the brake pad 1009 into its central position between the carrier horns 1004, 1005.

A second rectilinear region is oriented radially, that is to say in the sliding-in direction z, such that the brake pad 1009, after reaching the mounting region 1033, can be slid between the carrier horns 1004, 1005 in a sliding-in direction y axially with respect to the axis of rotation of the brake disk.

In the variant of the brake carrier 1 shown in FIGS. 1-5, projections 1045, 1055 are integrally formed on respective inner sides 1041, 1051 of the carrier horns 1004, 1005, which projections serve for radially securing the brake pad 109 with correspondingly shaped pad carrier plate 1091 with lateral recesses 1094.

Below the projections 1045, 1055 of the carrier horns 1004, 1005, there is integrally formed in each case one receptacle 1046, 1056 for receiving a respective projection 1095 of the pad carrier plate 1091, wherein the guide contours 1044, 1054 end in each case at a side edge of the respective receptacle 1046, 1056. The height $h_2$ of the projections 1095 preferably corresponds here to the height $h_1$ of the receptacles 1046, 1056 of the carrier horns 1004, 1005, such that the brake pad is fixed radially in the receptacles 1046, 1056.

Figure 28:
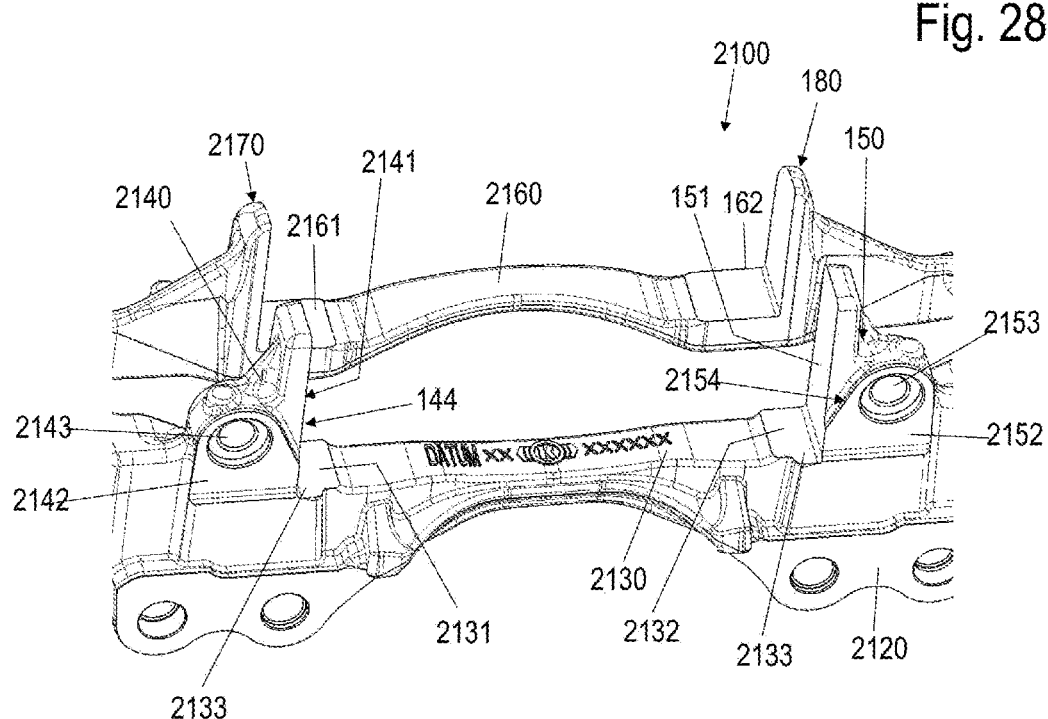
FIG. 28 is a perspective view of an alternative design variant of a brake carrier.
Figure 29:
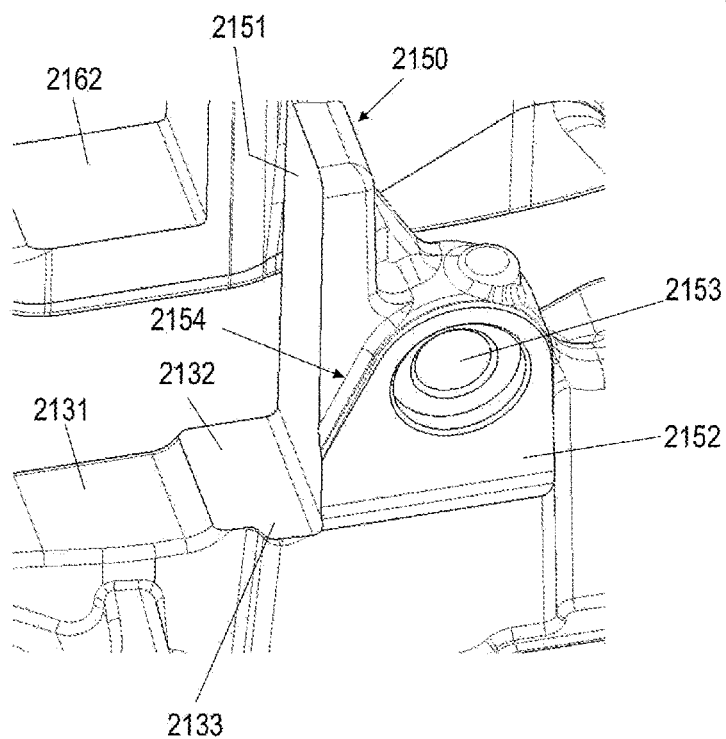
FIG. 29 is a perspective detail view of the brake carrier from FIG. 28.

In the alternative design variant of a brake carrier 2100 shown in FIGS. 28 and 29, the guide contours 2144, 2154 are designed in the same way as in the case of the brake carrier 2100 described above.

A major difference of this brake carrier 2100 in relation to the above-described brake carrier are the rectilinear—planar—inner surfaces 2141, 2151 of the carrier horns 2140, 2150, such that, in the case of a brake carrier 2100 designed in this way, not only the direct insertion of the brake pad between the carrier horns 2140, 2150 but also a laterally offset sliding-in of the brake pad is easily possible, because the exactly central orientation of the brake pad is, in this case too, simplified by the guide contours 2144, 2154 and the mounting region 2131 on the bearing surfaces 2131, 2132 of the bridge 2130.

The brake carrier 2100 is also, in the design variant shown here, designed so as to engage over a brake disk (not illustrated), such that the carrier horns 2140, 2150 and the bridge 2130 form an application-side pad slot, and the carrier horns 2170, 2180 and the bridge 2160 form a reaction-side pad slot.

It is preferably possible for only the application-side carrier horns 2140, 2150, 2140, 2150 to be formed with such guide contours 2144, 2154, 2144, 2154 for guiding a brake pad in a sliding-in position to the side of the pad slot.

The reaction-side carrier horns 2170, 2180 are, by contrast, preferably formed without such guide contours. Likewise, the bearing surfaces 2161, 2162, 2161, 2162 of the reaction-side bridges 2160, 2160 are designed such that the width thereof in the direction of the axis of rotation of the brake disk corresponds to the width of the carrier horns 2170, 2180, 2170, 2180.

The invention is not limited by the exemplary embodiments described above. The invention may be modified in a variety of ways within the scope of the appended claims.

LIST OF REFERENCE DESIGNATIONS

| | |
|---|---|
| Brake caliper | 1 |
| Application section | 1a |
| Caliper rear section | 1b |
| Tension strut | 1c |
| Opening | 1d |
| Openings (bores) | 1e |
| Lugs | 1f |
| Recess | 1g |
| Brake disk | 2 |
| Brake disk axis of rotation | 2a |
| Brake carrier | 3 |
| Guide beams | 4 |
| Pad slots | 11, 12 |
| Support surfaces | 11a, 11b; 12a, 12b |
| Pad slot base | 11c; 12c |
| Brake carrier horns | 13, 14 and 15, 16 |
| Undercut | 17, 18 |
| Brake pad | 100 |
| Pad carrier | 110 |
| Side edges | 111, 112 |
| Projection | 113, 114 |
| Holding clip | 115 |
| Lugs | 116, 117 |
| Friction pad | 120 |
| Pad spring | 130 |
| Slot | 131, 132 |
| Ends | 133, 134 |
| Brake pad | 200 |
| Pad carrier | 210 |
| Side edges | 211, |
| Lugs | 213, 214 |
| Passage hole | 215 |
| Opening | 216 |
| Form-fit means | 217 |
| Friction pad | 220 |
| Pad spring | 230 |
| Slots | 231, 232, 233 |
| Cover | 240 |
| Limb | 241, 242 |
| Web | 243 |
| Connecting web | 244 |
| Ring | 245 |
| Hold-down clip | 250 |
| End | 251 |
| End | 252 |
| Bore | 253 |
| Pin | 254 |
| Bolt/pin | 255 |
| Spring | 256 |
| Passage opening | 257 |
| Projection | 258 |
| Screws | 259 |
| Securing element | 260 |
| Lugs | 261 |
| Web | 262 |
| Contours | 2501, 2502 |
| Cable bridge | 271 |
| Web section | 272 |
| Fastening means | 273, 274 |
| Counterpart fastening means | 275, 276 |
| Lugs | 277 |
| Lug | 278 |
| Brake carrier | 1001 |
| Attachment region | 1002 |
| Bridge | 1003 |
| Bearing surface | 1031 |
| Bearing surface | 1032 |
| Mounting region | 1033 |
| Carrier horn | 1004 |
| Inner side | 1041 |
| Side surface | 1042 |
| Receiving bore | 1043 |
| Guide contour | 1044 |
| Projection | 1045 |
| Receptacle | 1046 |
| Carrier horn | 1005 |
| Inner side | 1051 |
| Side surface | 1052 |
| Receiving bore | 1053 |
| Guide contour | 1054 |
| Projection | 1055 |
| Receptacle | 1056 |
| Bridge | 1006 |
| Bearing surface | 1061 |
| Bearing surface | 1062 |
| Carrier horn | 1007 |
| Carrier horn | 1008 |
| Pad carrier plate | 1091 |
| Side surface | 1092 |
| Side surface | 1093 |
| Recess | 1094 |
| Projection | 1095 |
| Lower edge | 1096 |
| Abutment surface | 1097 |
| Holding tab | 1098 |
| Pad retaining spring | 1010 |
| Brake carrier | 2100 |
| Attachment region | 2100 |
| Bridge | 2130 |
| Bearing surface | 2131 |
| Bearing surface | 2132 |
| Mounting region | 2133 |
| Carrier horn | 2140 |
| Inner side | 2141 |
| Side surface | 2142 |
| Receiving bore | 2143 |
| Guide contour | 2144 |
| Carrier horn | 2150 |
| Inner side | 2151 |
| Side surface | 2152 |
| Receiving bore | 2153 |
| Guide contour | 2154 |
| Bridge | 2160 |
| Bearing surface | 2161 |
| Bearing surface | 2162 |
| Carrier horn | 2170 |
| Carrier horn | 2180 |
| Height of the projection | $h_1$ |
| Height of the recess | $h_2$ |
| Direction of rotation | U |
| Axis of rotation | D |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake for a vehicle, comprising:
a brake caliper which engages over a brake disk, the brake caliper being a sliding caliper, and is arranged on a positionally fixed brake carrier, the brake caliper including an application device for applying the disk brake; and
two brake pads which each have a pad carrier and a friction pad fastened to the pad carrier and of which one, as an application-side brake pad, is pressible by way of the application device against the brake disk on one side of the brake disk and of which the other, as a reaction-side brake pad, is arranged on the opposite side of the brake disk, the application-side brake pad being inserted into a pad slot of the brake carrier and the reaction-side brake pad being inserted onto another pad slot of the brake carrier or the brake caliper,
wherein
the brake caliper has a central caliper opening over the brake disk, through which caliper opening the two brake pads are insertable into the respective pad slot of the brake carrier, a hold-down clip is provided which is configured to radially secure only the reaction-side brake pad in its pad slot in the brake carrier, wherein the hold-down clip is, with its end averted from the brake pad, held on the brake caliper, and the application-side brake pad is secured radially in the brake carrier in its pad slot by way of a form fit.

2. The disk brake according to claim 1, wherein the application-side brake pad has a pad spring which is secured on the application-side brake pad and which has ends which lie resiliently on brake carrier horns of the brake carrier.

3. The disk brake according to claim 1, wherein the hold-down clip engages into the reaction-side brake pad.

4. The disk brake according to claim 1, wherein the hold-down clip engages over the reaction-side brake pad entirely or partially axially parallel with respect to the brake disk.

5. The disk brake according to claim 1, wherein the hold-down clip is, with its end averted from the reaction-side brake pad to be secured radially, held releasably on the brake caliper.

6. The disk brake according to claim 1, wherein the hold-down clip is non-releasably fixed to a part of the reaction-side brake pad to be secured radially.

7. The disk brake according to claim 6, wherein the hold-down clip is fixed to a cover and/or to a pad spring of the brake pad to be held down.

8. The disk brake according to claim 7, wherein the pad spring entirely or partially extends through the cover.

9. The disk brake according to claim 7, wherein
the pad spring is formed in one piece with the cover, or
the pad spring is cohesively connected to the cover.

10. The disk brake according to claim 7, wherein the hold-down clip is connected to the cover with a form-fit.

11. The disk brake according to claim 1, wherein the hold-down clip is releasably or non-releasably fastened to the brake caliper or is formed in one piece therewith.

12. The disk brake according to claim 1, wherein the application-side brake pad is secured radially in the brake carrier by way of projections on the pad carrier, which projections engage into corresponding undercuts of the brake carrier.

13. The disk brake according to claim 1, wherein the disk brake includes a brake carrier that comprises:
an attachment region for fixing to a vehicle axle; and
at least one pad slot for receiving and supporting at least the application-side brake pad,
wherein
the at least one pad slot is formed by an entry-side carrier horn, an exit-side carrier horn and a bridge which connects the entry-side carrier horn and the exit-side carrier horn,
regions of the bridge adjoining the carrier horns form bearing surfaces for radially supporting the application-side brake pad, and
respective guide contours on a side surface of the carrier horns are configured to guide the application-side brake pad into a sliding-in position to a side of the at least one pad slot, in which position the application-side brake pad is slidable, axially with respect to the vehicle axle, into the at least one pad slot between the carrier horns.

14. The disk brake according to claim 13, wherein the bearing surfaces for radially supporting the application-side brake pad are laterally enlarged by a mounting region for limiting sliding movement of the brake pad into the sliding-in position to the side of the at least one pad slot.

15. The disk brake according to claim 13, wherein the guide contours are integrally formed, as material thickening of the carrier horns, on side surfaces of the carrier horns.

16. The disk brake according to claim 13, wherein the guide contours of the carrier horns of at least one pad slot are shaped so as to converge on one another toward the bridge.

17. The disk brake according to claim 13, wherein the guide contours each have at least one rectilinear guide region.

18. The disk brake according to claim 17, wherein
the at least one rectilinear guide region includes
a first rectilinear guide region is oriented at an angle with respect to a plane of an inner side of the carrier horns, and
a second rectilinear guide region lies in a plane of the inner side of the respective carrier horn.

19. The disk brake according to claim 18, wherein, on respective inner sides of the carrier horns, there are integrally formed projections for radially securing the brake pad with a correspondingly shaped pad carrier plate with lateral recesses.

20. The disk brake according to claim 19, wherein
below the projections, there is integrally formed in each case one receptacle for receiving a respective projection of the pad carrier plate, and
the guide contours end in each case at a side edge of the respective receptacle.

21. A method for mounting brake pads in a disk brake according to claim 1, the method comprising the acts of:
inserting the reaction-side brake pad radially through the caliper opening of the brake caliper into its pad slot in the brake carrier, wherein the reaction-side brake pad is then radially secured there by way of a hold-down clip which is arranged on the brake caliper;
first inserting the application-side brake pad radially into the disk brake through the caliper opening of the brake caliper and then, by way of an axial movement, moving the application-side brake pad into a position in the pad slot, assigned thereto, of the brake carrier in which the application-side brake pad is secured there radially by way of a form fit between the application-side brake pad and the brake carrier; and
placing ends of a pad spring, which is secured on the application-side brake pad, onto brake carrier horns of the brake carrier so as to lie resiliently on the brake carrier horns of the brake carrier.

22. A brake pad set comprising:
a reaction-side brake pad; and
an application-side brake pad, wherein
the application-side brake pad is secured radially in a brake carrier by way of at least one form-fit element on a pad carrier and has a pad spring which is secured on the application-side brake pad,
the pad spring has ends which are designed to lie resiliently on brake carrier horns of an associated brake carrier, and
the reaction-side brake pad is designed for interacting with a hold-down clip, which is designed such that it radially secures only the reaction-side brake pad in its pad slot on a disk brake.

23. The brake pad set according to claim 22, wherein the application-side brake pad is secured radially in the brake carrier by way of projections on the pad carrier.

24. The brake pad set according to claim 22, wherein the brake pad set is designed as a structural unit with a hold-down clip, which is designed such that it radially secures only one of the two brake pads in its pad slot on a disk brake.

25. The brake pad set according to claim 22, wherein the hold-down clip is fixed to the reaction-side brake pad or engages over or engages into the reaction-side brake pad.

26. A brake pad carrier for a disk brake, comprising:
an attachment region for fixing to a vehicle axle; and
an application-side pad slot for receiving and supporting an application-side brake pad, a reaction-side pad slot for receiving and supporting an application-side brake pad, wherein
the pad slots are formed by respective entry-side carrier horns, exit-side carrier horns and bridges which connect the respective entry-side carrier and exit-side carrier horns,
regions of the bridge adjoining the application-side carrier horns form bearing surfaces for radially supporting the application-side brake pad,
guide contours at side surfaces of the application-side brake horns configured to guide the application-side brake pad into a sliding-in position to a side of the application-side pad slot from which the application-side brake pad 1s slidable axially into the application-side pad slot,
brake pad abutment surfaces of the application-side carrier horns facing the application-side pad slot include features configured, when the application-side brake pad is in an installed position, to cooperate with a form-fit with corresponding features of the application-side brake pad to radially retain the application-side brake pad in the application-side pad slot,
brake pad abutment surfaces of the reaction-side carrier horns facing the reaction-side pad slot do not include reaction-side brake pad radial retention features, and
a hold-down clip is provided which is configured to radially secure only the reaction-side brake pad in its pad slot in the brake carrier, wherein the hold-down clip is, with its end averted from the brake pad, held on the brake caliper.

* * * * *